(12) United States Patent
Kang et al.

(10) Patent No.: US 9,965,123 B2
(45) Date of Patent: May 8, 2018

(54) METHOD OF MANUFACTURING TOUCH PANEL

(71) Applicant: SAMSUNG DISPLAY CO., LTD., Yongin-si, Gyeonggi-Do (KR)

(72) Inventors: Sungku Kang, Suwon-si (KR); Dongeun Lee, Asan-si (KR); Sangmin Baek, Asan-si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 311 days.

(21) Appl. No.: 14/979,646

(22) Filed: Dec. 28, 2015

(65) Prior Publication Data

US 2016/0224154 A1 Aug. 4, 2016

(30) Foreign Application Priority Data

Feb. 4, 2015 (KR) ........................ 10-2015-0017487

(51) Int. Cl.
  *H05K 3/02* (2006.01)
  *H05K 3/10* (2006.01)
  *G06F 3/044* (2006.01)

(52) U.S. Cl.
  CPC .... *G06F 3/044* (2013.01); *G06F 2203/04103* (2013.01); *G06F 2203/04111* (2013.01)

(58) Field of Classification Search
  CPC .... B41F 3/36; B41F 5/02; B41F 9/002; B41F 19/001; B41F 19/005; G03G 15/18; G03G 15/652; G03G 15/6552; G03F 7/002; G03F 7/0025; G03F 7/16; G06F 3/044; H05K 3/0002; H05K 3/0091; H05K 3/10; H05K 3/1258; H05K 3/1275
  See application file for complete search history.

(56) References Cited

U.S. PATENT DOCUMENTS

| | | | | |
|---|---|---|---|---|
| 6,706,548 B2 * | 3/2004 | Liu | ....................... | B81B 7/0006 438/52 |
| 7,704,773 B2 * | 4/2010 | Kogut | ................... | B81B 3/0072 257/E21.613 |
| 8,298,847 B2 * | 10/2012 | Kogut | ................... | B81B 3/0072 257/419 |

(Continued)

FOREIGN PATENT DOCUMENTS

| | | | |
|---|---|---|---|
| JP | 2011-086084 A | 4/2011 | |
| JP | 2013-214185 A | 10/2013 | |

(Continued)

*Primary Examiner* — Paul D Kim
(74) *Attorney, Agent, or Firm* — Lee & Morse, P.C.

(57) ABSTRACT

A method of manufacturing a touch panel, the method including forming electrode patterns; forming insulating patterns on the electrode patterns; forming a sacrificial layer on the electrode patterns and insulating patterns such that the sacrificial layer includes openings exposing portions of the insulating patterns; forming a conductive layer on the sacrificial layer and in each of the openings; and removing the sacrificial layer to form bridge patterns corresponding to the openings, wherein the sacrificial layer includes a first layer including first openings therein that expose portions of the insulating patterns; and a second layer including second openings therein that expose portions of the insulating patterns, the second layer having a thickness that is larger than a thickness of the first layer.

18 Claims, 26 Drawing Sheets

(56) References Cited

U.S. PATENT DOCUMENTS

| | | | |
|---|---|---|---|
| 8,698,257 B2* | 4/2014 | Kamiyama | B81C 1/00142 |
| | | | 257/418 |
| 2002/0164884 A1 | 11/2002 | Lishan | |
| 2013/0222314 A1 | 8/2013 | Wang et al. | |
| 2014/0284730 A1* | 9/2014 | Saito | B81B 3/0086 |
| | | | 257/415 |

FOREIGN PATENT DOCUMENTS

| | | |
|---|---|---|
| KR | 10-2013-0016376 A | 2/2013 |
| KR | 10-2013-0111785 A | 10/2013 |

* cited by examiner

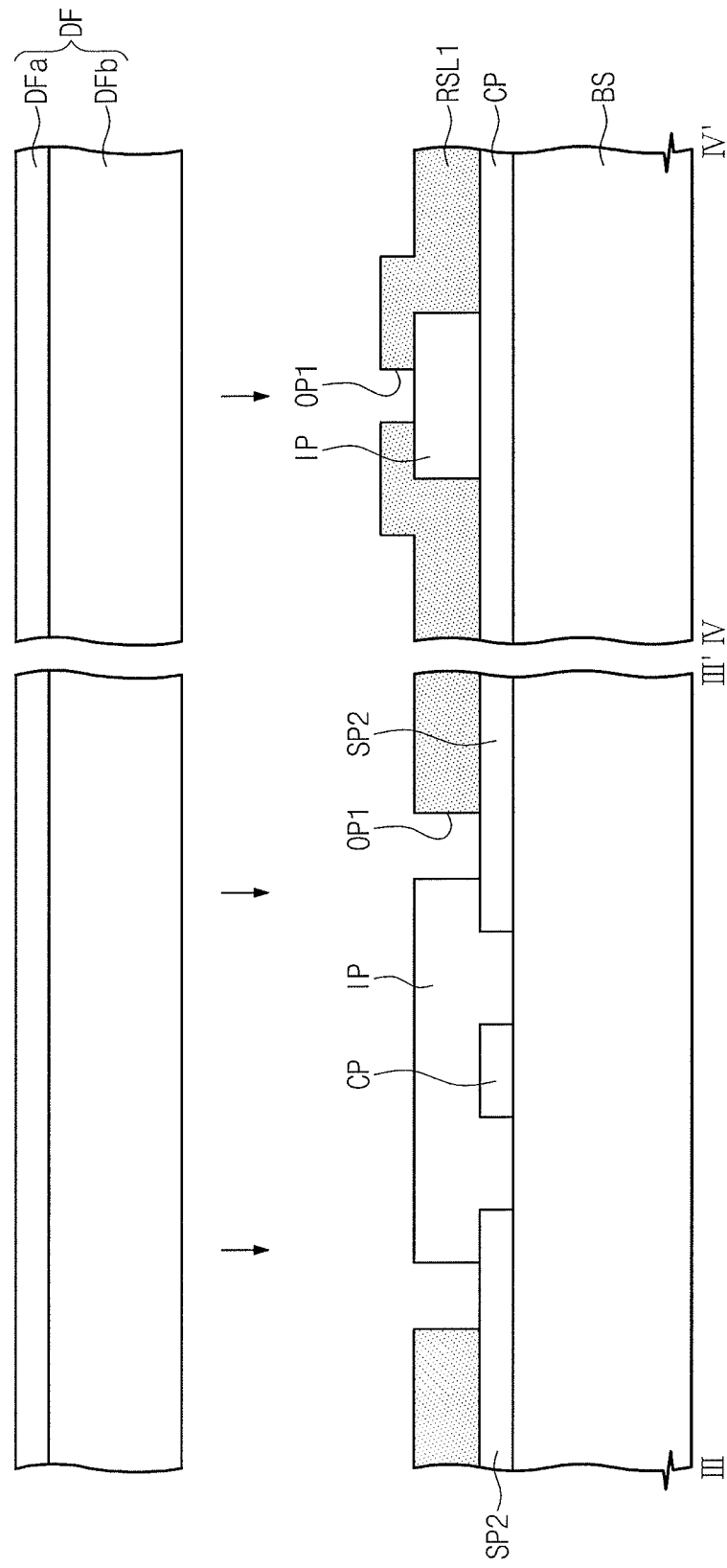

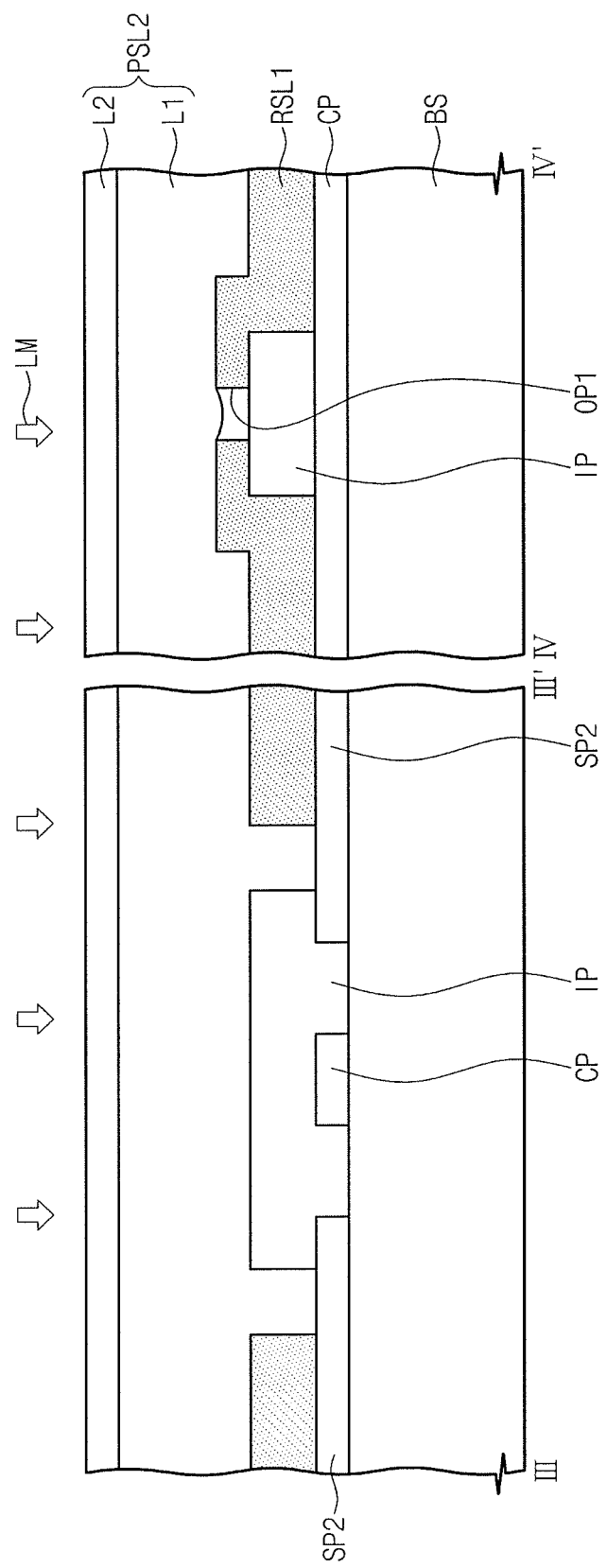

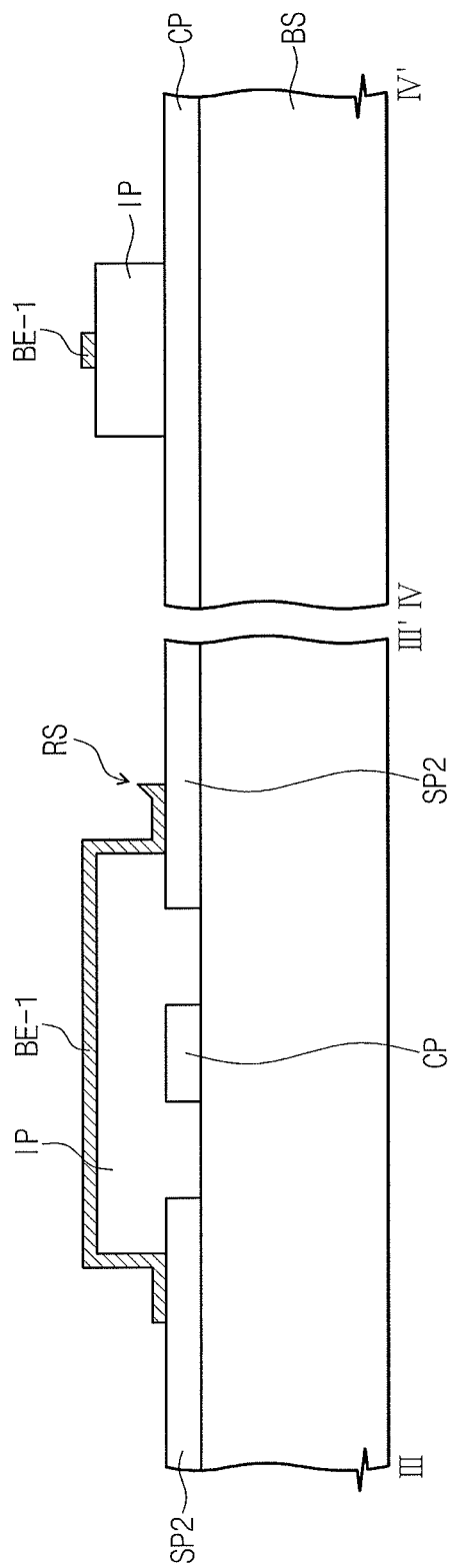

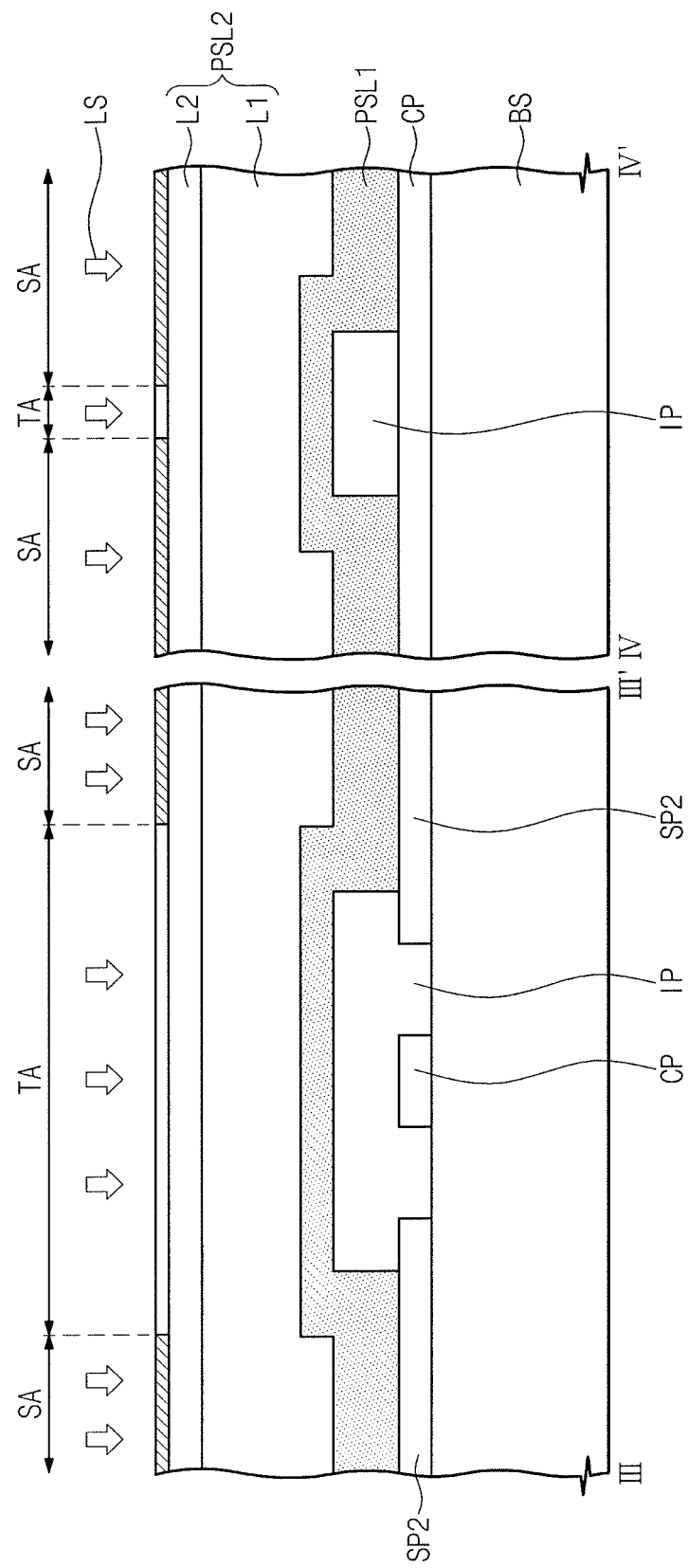

METHOD OF MANUFACTURING TOUCH PANEL

CROSS-REFERENCE TO RELATED APPLICATION

Korean Patent Application No. 10-2015-0017487, filed on Feb. 4, 2015, in the Korean Intellectual Property Office, and entitled: "Method of Manufacturing Touch Panel," is incorporated by reference herein in its entirety.

BACKGROUND

1. Field

Embodiments relate to a method of manufacturing a touch panel.

2. Description of the Related Art

A touch panel senses a touch provided from the outside and outputs a sensing signal corresponding to the touch. A touch panel may be provided as a touch screen panel that is integrated with a display unit displaying an image, or as a touch substrate that may be attached to other independent components, such as a display substrate.

The touch panel may be driven by various techniques, such as resistive, capacitive, infrared, and ultrasonic techniques, according to a contact sensing technique. The touch panel may include a plurality of touch electrodes for sensing a contact. The touch electrodes may be disposed on the same or different layers.

SUMMARY

Embodiments are directed to a method of manufacturing a touch panel.

The embodiments may be realized by providing a method of manufacturing a touch panel, the method including forming electrode patterns; forming insulating patterns on the electrode patterns; forming a sacrificial layer on the electrode patterns and insulating patterns such that the sacrificial layer includes openings exposing portions of the insulating patterns; forming a conductive layer on the sacrificial layer and in each of the openings; and removing the sacrificial layer to form bridge patterns corresponding to the openings, wherein the sacrificial layer includes a first layer including first openings therein that expose portions of the insulating patterns; and a second layer including second openings therein that expose portions of the insulating patterns, the second layer having a thickness that is larger than a thickness of the first layer.

Removing the sacrificial layer may include performing a lift-off process.

The first layer may be formed using liquid photoresist, and the second layer may be formed using a dry film.

The dry film may include a support layer; and a photosensitive resin layer on the support layer, the photosensitive resin layer having adhesive properties.

The liquid photoresist may be of a positive type.

The photosensitive resin layer may be of a positive type.

The thickness of the first layer may be about 0.1 µm to about 2.0 µm, and the thickness of the second layer may be about 3.0 µm to about 8.0 µm.

Forming the sacrificial layer may include forming the first layer and forming the second layer, and the first openings and the second openings may be separately formed.

Forming the first layer may include applying the liquid photoresist to the electrode patterns and drying the applied liquid photoresist to form a first photosensitive layer; and forming the first openings in the first photosensitive layer.

Forming the second layer may include providing the dry film on the first layer; laminating the dry film to form a second photosensitive layer; and forming the second openings in the second photosensitive layer.

A width of each of the second openings when viewed from one direction may be wider than a width of each of the first openings when viewed from the one direction.

The first openings and the second openings may be simultaneously formed.

Forming the sacrificial layer may include applying the liquid photoresist to the electrode patterns; drying the liquid photoresist to form a first photosensitive layer; providing the dry film on the first photosensitive layer; laminating the dry film to form a second photosensitive layer; and simultaneously pattering the first photosensitive layer and the second photosensitive layer to form the first openings and the second openings.

Forming the conductive layer may include performing a deposition process.

The electrode patterns may include first sensing parts that are spaced apart from each other in one direction; connecting parts that extend in one direction between adjacent first sensing parts to connect the adjacent first sensing parts; and second sensing parts arranged in another direction crossing the one direction, the second sensing parts being spaced apart from each other with the connecting parts therebetween.

The insulating patterns may cross respective ones of the connecting parts.

The bridge patterns may be insulated from and cross respective ones of the connecting parts, and the bridge patterns may connect adjacent second sensing parts.

A width of each of the bridge patterns measured in the other direction may be less than or equal to about 20 µm.

BRIEF DESCRIPTION OF THE DRAWINGS

Features will be apparent to those of skill in the art by describing in detail exemplary embodiments with reference to the attached drawings in which:

FIGS. 7A to 7L illustrate stages in a method of manufacturing a touch unit according to an embodiment;

FIGS. 8A and 8B illustrate cross-sectional views showing stages in a method of manufacturing a touch unit according to an embodiment; and FIGS. 9A to 9F illustrate cross-sectional views showing stages in a method of manufacturing a touch unit according to an embodiment.

DETAILED DESCRIPTION

Figure 1:
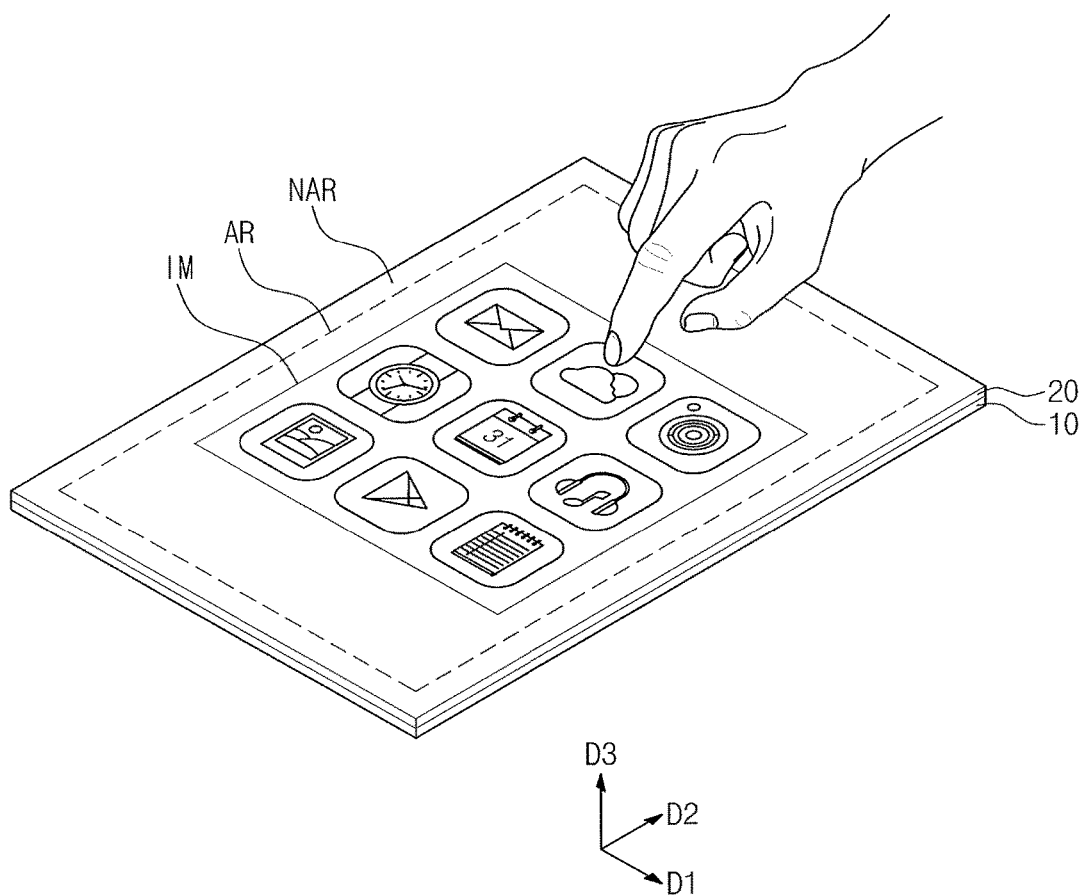
FIG. 1 illustrates a perspective view of a touch panel according to an embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
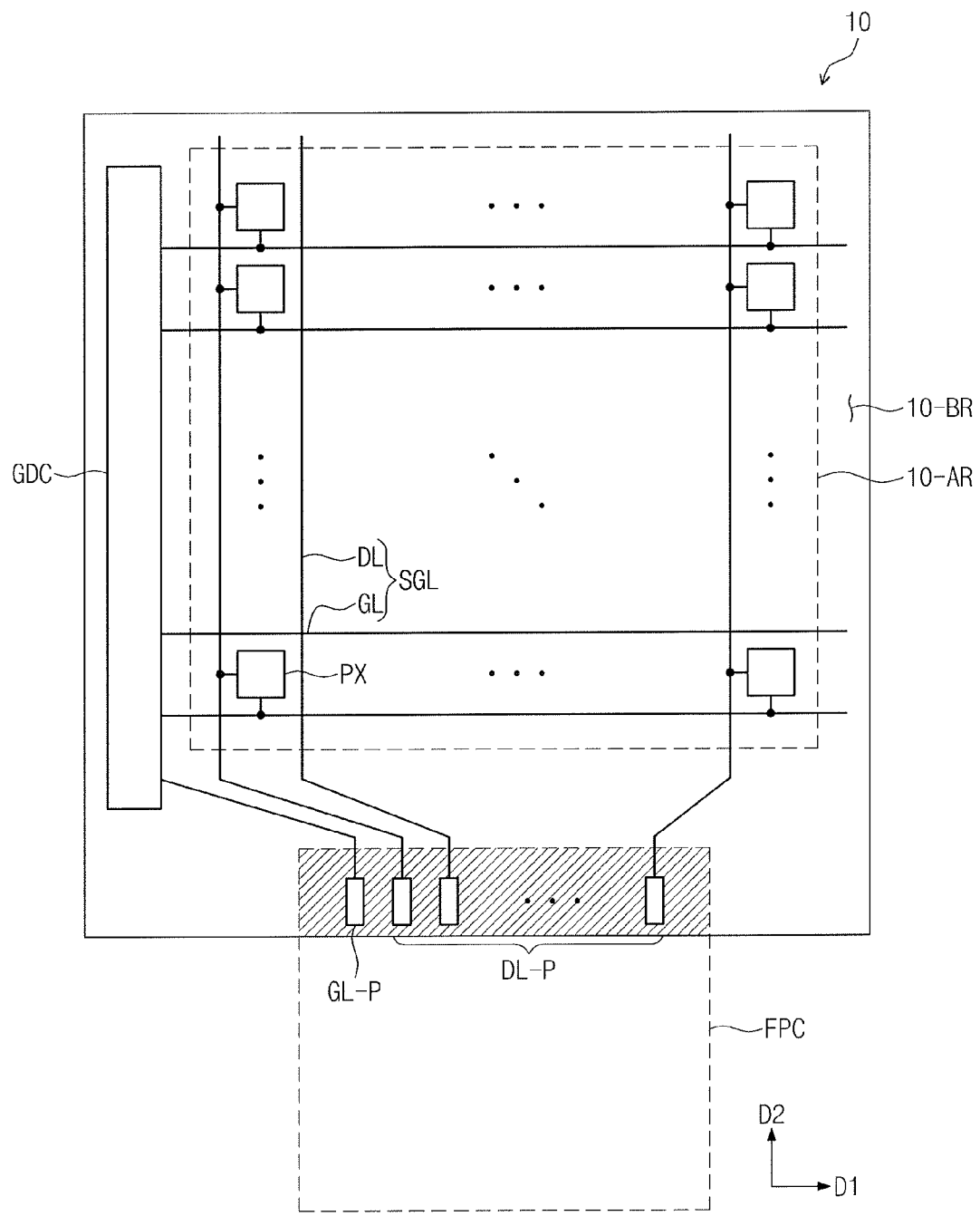
FIG. 2 illustrates a schematic plan view of a display unit according to an embodiment.
Figure 3:
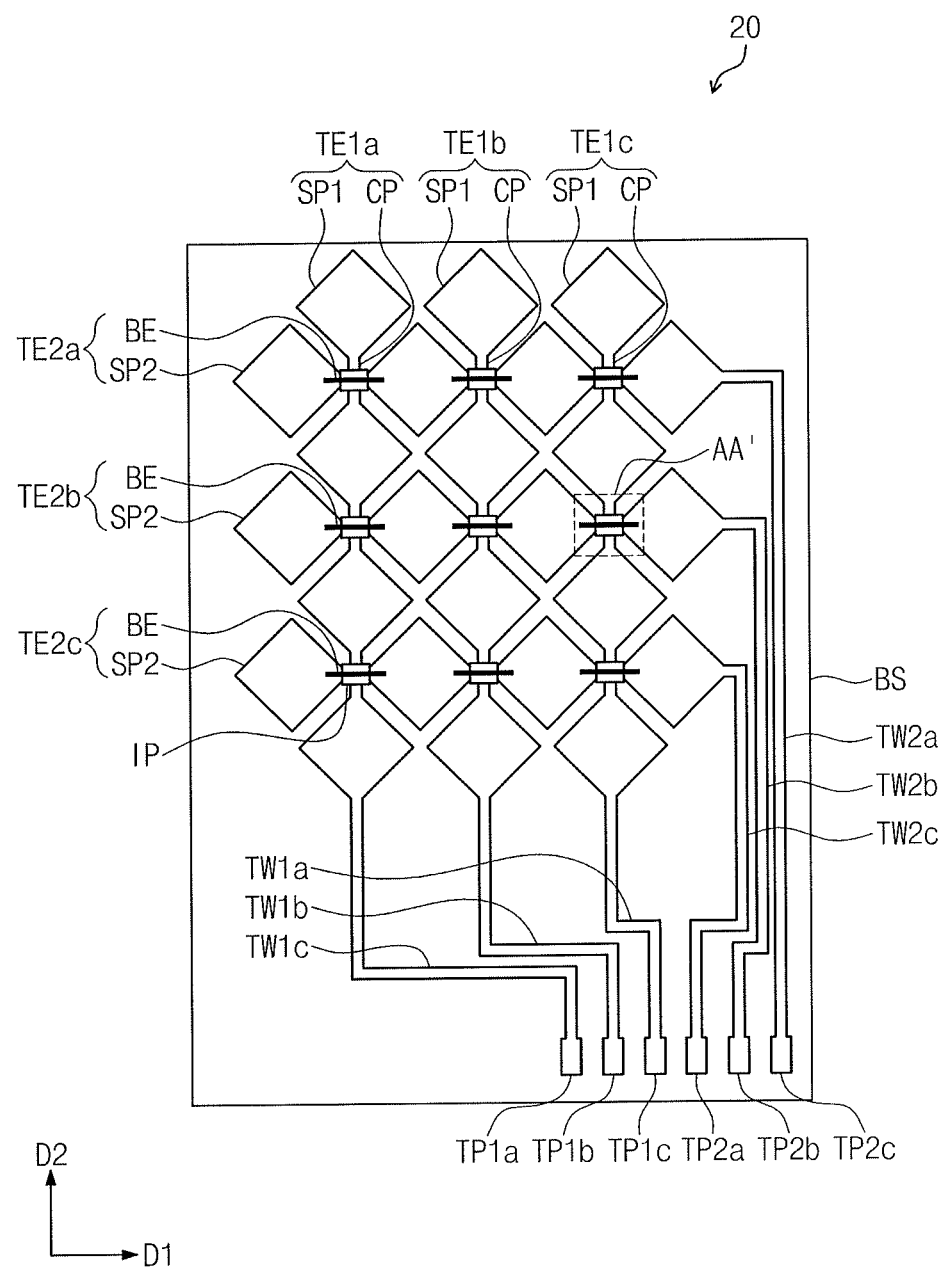
FIG. 3 illustrates a schematic plan view of a touch unit according to an embodiment.

FIG. 1 illustrates a perspective view of a touch panel according to an embodiment. FIG. 2 illustrates a schematic plan view of a display unit according to an embodiment. FIG. 3 illustrates a schematic plan view of a touch unit according to an embodiment. A touch screen panel according to an embodiment is discussed with reference to FIGS. 1 to 3.

The touch screen panel may be divided into an active region AR and a non-active region NAR on a plane defined by a first direction D1 and a second direction D2 that cross each other. The touch screen panel may display an image IM on the active region AR to provide information to the outside, e.g., to a user. The touch screen panel may sense an external touch signal on the active region AR, and may provide a corresponding response to the outside.

The non-active region NAR may be adjacent to the active region AR. The non-active region NAR may surround the active region AR. The non-active region NAR may not be activated, even when an electrical signal is not transmitted or an external signal is input.

The touch screen panel may include a display unit 10 and a touch unit 20. The display unit 10 and the touch unit 20 may be stacked sequentially in a thickness direction D3 (hereinafter, referred to as a "third direction").

The display unit 10 displays the image IM. The display unit 10 may be a display panel that receives power to display the image IM. For example, the display unit 10 may employ a liquid crystal display panel, an organic light emitting display panel, an electrophoretic display panel, or an electrowetting display panel.

As shown in FIG. 2, the display unit 10 may be divided into a pixel region 10-AR and a peripheral region 10-BR on the plane.

The pixel region 10-AR is a region where an image is created and displayed. The pixel region 10-AR may overlap with the active region AR. The peripheral region 10-BR may surround the pixel region 10-AR.

The display unit 10 may include signal lines SGL, a gate driving circuit unit GDC, and a pixel PX. The signal lines SGL may include gate lines GL and data lines DL. The gate lines GL may extend in or along the first direction D1 and may be arranged (e.g., may be spaced apart from one another) in the second direction D2. The data lines DL may be insulated from and may cross the gate lines GL, respectively.

The gate driving circuit unit GDC may be disposed on the peripheral region 10-BR. The gate driving circuit unit GDC may be connected to the gate lines GL. The gate driving circuit unit GDC may sequentially provide scan signals to the gate lines GL.

The gate driving circuit unit GDC may be mounted on the display unit 10 by using a chip on glass (COG) technology. In an implementation, a gate driving circuit unit may be provided separately and bonded to the display unit 10.

The data lines DL may be disposed on the pixel region 10-AR and may extend to the peripheral region 10-BR. Data pads DL-P may be at one end of the data lines DL and may be on the peripheral region 10-BR. The data lines DL may receive data signals through the data pads DL-P.

The display unit 10 may be connected to a main circuit unit FPCB. In the present embodiment, the main circuit unit FPCB is shown by a dotted line.

The main circuit unit FPCB may include a data driving circuit unit. The main circuit unit FPC may be connected to the data pads DL-P to output data signals to the data lines DL.

Also, the main circuit unit FPC may be connected to the gate pad GL-P. The gate pad GL-P may be disposed on the display unit 10 adjacent to the data pads DL-P.

The gate pad GL-P may be connected to the gate driving circuit unit GDC. The main circuit unit FPCB may provide a control signal to the gate driving circuit unit GDC through the gate pad GL-P.

The pixels PX may be disposed on the pixel region 10-AR. Each of the pixels PX may be connected to a corresponding gate line among the gate lines GS and to a corresponding data line among the data lines DL. Each of the pixels PX may be driven by a scan signal flowing in the gate lines GL and may create an image corresponding to a data signal flowing in the data lines DL.

Referring to FIGS. 1 and 3, the touch unit 20 may sense external touch information to provide sensed information as one of input signals of the touch screen panel. The external touch information may be a user touch input to the touch screen panel.

The touch unit 20 may be a touch panel. The touch panel may be provided in the form of a layer disposed directly on the display unit 10. In an implementation, the touch panel may also be provided as a separate touch substrate independent from the display unit 10.

The touch unit 20 may include insulating patterns IP, electrode patterns, and bridge patterns BE. The insulating patterns IP, electrode patterns, and bridge patterns BE may be disposed on a base substrate BS.

The base substrate BS may be formed of a transparent insulating material. The base substrate BS may include various suitable materials and structures.

For example, the base substrate BS may be the display unit 10. In this case, the base substrate BS may include pixels PX and the electrode patterns may be electrically insulated from the pixels PX.

In an implementation, the base substrate BS may be, e.g., a glass substrate, plastic substrate, or film. The base substrate BS may be one component of the display unit 10 and may electrically insulate the display unit 10 from the electrode patterns.

The electrode patterns may include first sensing parts SP1, connecting parts CP, and second sensing parts SP2. The first sensing parts SP1 may be spaced apart from each other in or along the second direction D2.

The connecting parts CP may extend in or along the second direction D2. The connecting parts CP may be between the first sensing parts SP1 to connect adjacent first connecting parts SP1. The first sensing parts SP1 and the connecting parts CP may be electrically connected to each other to form first electrodes TE1*a*, TE1*b*, and TE1*c*.

The second sensing parts SP2 may be arranged in (e.g., may be repeatedly provided and spaced apart from one another along) the first direction D1. The second sensing parts SP2 may be spaced apart from each other with connecting parts CP (connecting the adjacent first connecting parts SP1) therebetween. The insulating patterns IP may be between the second sensing parts SP2. The insulating patterns IP may be respectively disposed to overlap or overlie the connecting parts CP.

The bridge patterns BE may be respectively disposed on the insulating patterns IP. The bridge patterns BE may be insulated from and may cross the connecting parts CP, respectively.

The bridge patterns BE may be between the second sensing parts SP2 to electrically connect two adjacent second sensing parts SP2. In an implementation, the bridge patterns BE and the second sensing parts SP2 may form the second electrodes TE2a, TE2b, and TE2c.

The electrode patterns may further include, e.g., a first wiring TW1, first pads TP1a, TP1b, and TP1c, a second wiring TW2, and second pads TP2. The first wiring TW1 may include first conductive lines TW1a, TW1b, and TW1c. The first conductive lines TW1a, TW1b, and TW may connect the first electrodes TE1a, TE1b, and TE1c to the first pads TP1a, TP1b, TP1c, respectively.

Likewise, the second wiring TW2 may include second conductive lines TW2a, TW2b, and TW2c. The second conductive lines TW2a, TW2b, and TW2c may connect the second electrodes TE2a, TE2b, and TE2c to the second pads TP2a, TP2b, TP2c, respectively. The first electrodes TE1a, TE1b, and TE1c and the second electrodes TE2a, TE2b, and TE2c may receive electrical signals from the outside through the first pads TP1a, TP1b, and TP1c and the second pads TP2a, TP2b, and TP2c or may provide sensed touch signals to the outside.

Figure 4:
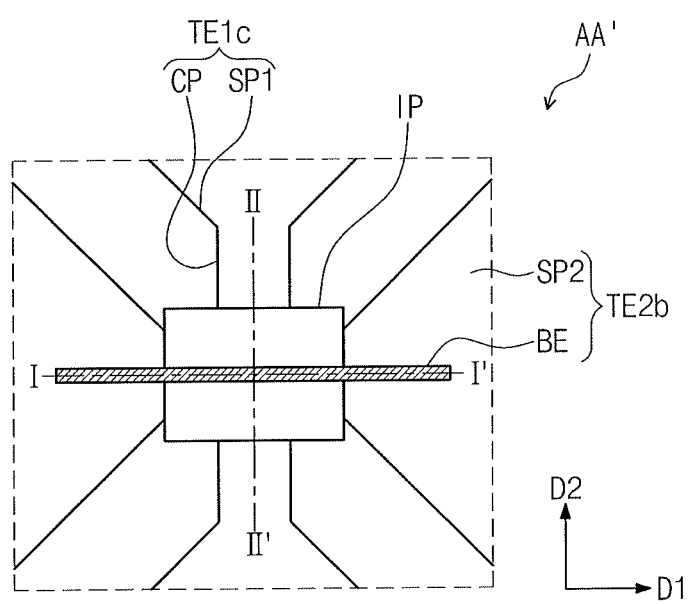
FIG. 4 illustrates an enlarged plan view of portion AA' in FIG. 3.
Figure 5A:
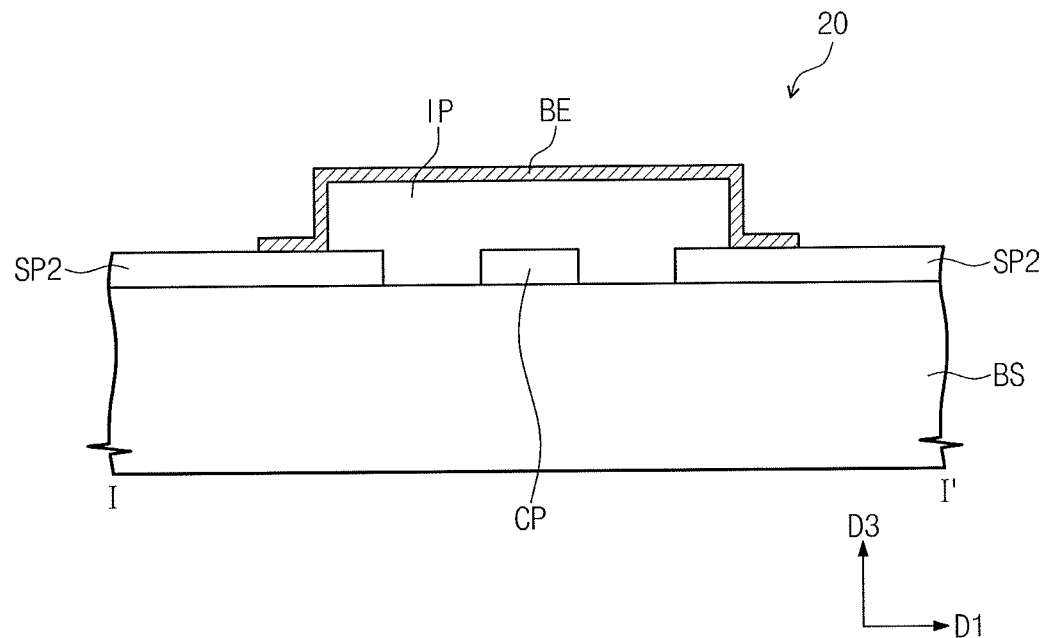
FIG. 5A illustrates a cross-sectional view taken along line I-I' in FIG. 4.
Figure 5B:
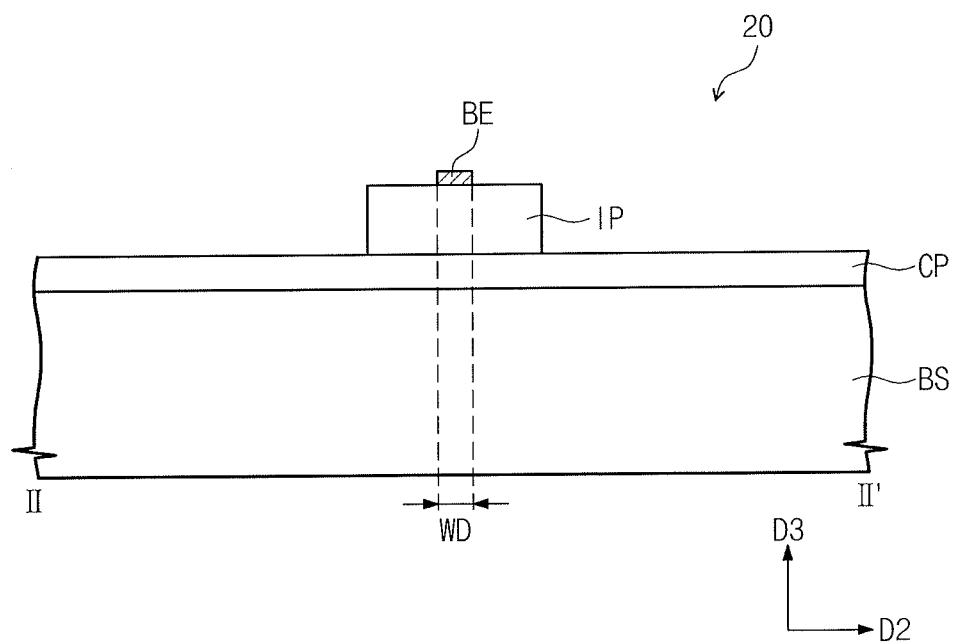
FIG. 5B illustrates a cross-sectional view taken along line II-II' in FIG. 4

FIG. 4 illustrates an enlarged plan view of portion AA' in FIG. 3. FIG. 5A illustrates a cross-sectional view taken along line I-I' in FIG. 4. FIG. 5B illustrates a cross-sectional view taken along line II-II' in FIG. 4. FIGS. 4 to 5B illustrate a single insulating pattern IP and a single bridge pattern BE on the insulating pattern IP.

In the following, a touch panel according to an embodiment is discussed in detail with reference to FIGS. 4 to 5B. The same components as those in FIGS. 1 to 3 have the same reference numerals and repeated detailed descriptions thereof may be omitted.

The insulating pattern IP may overlap or overlie the connecting part CP. In an implementation, the insulating pattern IP may partially overlap each of two adjacent second sensing parts SP2. The insulating pattern IP may cover the connecting part CP to electrically insulate the bridge pattern BE from the connecting part CP.

The bridge pattern BE may extend in or along the first direction and may protrude outwardly from or on the insulating pattern IP on the plane. The bridge pattern BE may protrude outwardly from the insulating pattern IP to overlap portions of adjacent second sensing parts SP2. The bridge pattern BE may electrically connect two second sensing parts SP2 that are adjacent to one another along the external and upper portions of the insulating pattern IP.

The bridge pattern BE may have a rectangular shape having a length defined in the first direction D1 and a width defined in the second direction D2 on the plane. The bridge pattern BE may have a fine pattern. In an implementation, the width WD of the bridge pattern may be about 20 μm or less.

The touch panel according to an embodiment has the bridge pattern BE having a fine width, so it is possible to reduce the possibility and/or prevent the bridge pattern BE from being externally viewed. Thus, even when a material considering visibility (e.g., a transparent material) is not used for the bridge pattern BE, the visibility may not decrease.

The bridge pattern BE may be formed of various suitable materials. In an implementation, the bridge pattern BE may be formed of opaque metal having high conductivity in addition or as an alternative to a transparent conductive oxide (TCO).

The touch panel according to an embodiment may include the bridge pattern BE having a fine width, there is a wide selection of materials for forming the touch unit 20, and it may also be possible to provide enhanced touch sensitivity. The touch panel according to an embodiment may provide enhanced visibility in a high resolution environment, and yield in a manufacturing process may be enhanced.

Figure 6:
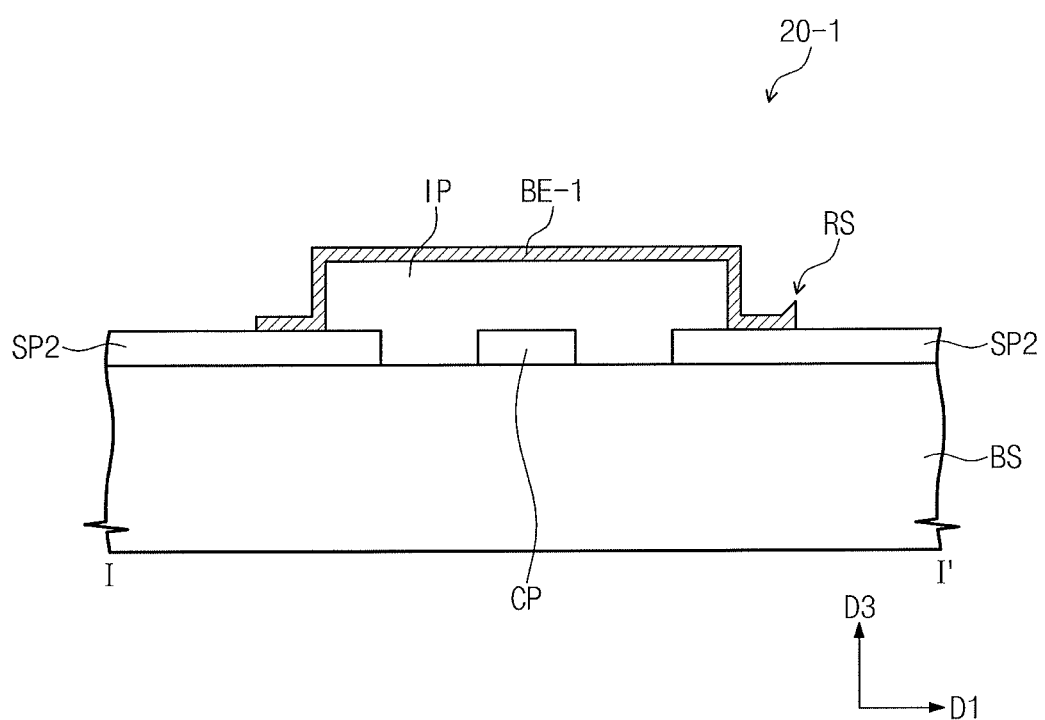
FIG. 6 illustrates an enlarged cross-sectional view of a portion of a touch unit according to an embodiment.

FIG. 6 illustrates an enlarged cross-sectional view of a portion of a touch unit according to an embodiment. A touch unit 20-1 in FIG. 6 may have substantially the same components as the touch unit 20 in FIG. 5A except for the bridge pattern BE-1. Thus, the same components as those in FIGS. 1 to 5B have the same reference numerals and repeated detailed descriptions thereof may be omitted.

The bridge pattern BE-1 may further include a residual part RS that remains on a side. The residual part RS may generally be on the external portion of the bridge pattern BE-1.

The residual part RS may be formed in the process of forming the bridge pattern BE-1. In the present embodiment, a resist layer may be removed through lift-off processing in a pattering process for forming the bridge pattern BE-1. The residual part RS may be formed in the process of removing the resist layer for pattering the bridge pattern BE-1.

Thus, the residual part RS may be an indicator showing that the process of forming the bridge pattern BE-1 includes performing a lift-off process. Related detailed descriptions are provided below.

FIGS. 7A to 7I illustrate diagrams showing stages in a method of manufacturing a touch unit according to an embodiment. For example, FIGS. 7C to 7I illustrate cross-sectional views taken along lines III-III' and VI-VI' in FIG. 7B. The same components as those in FIGS. 1 to 6 have the same reference numerals and repeated detailed descriptions may be omitted.

Figure 7A:
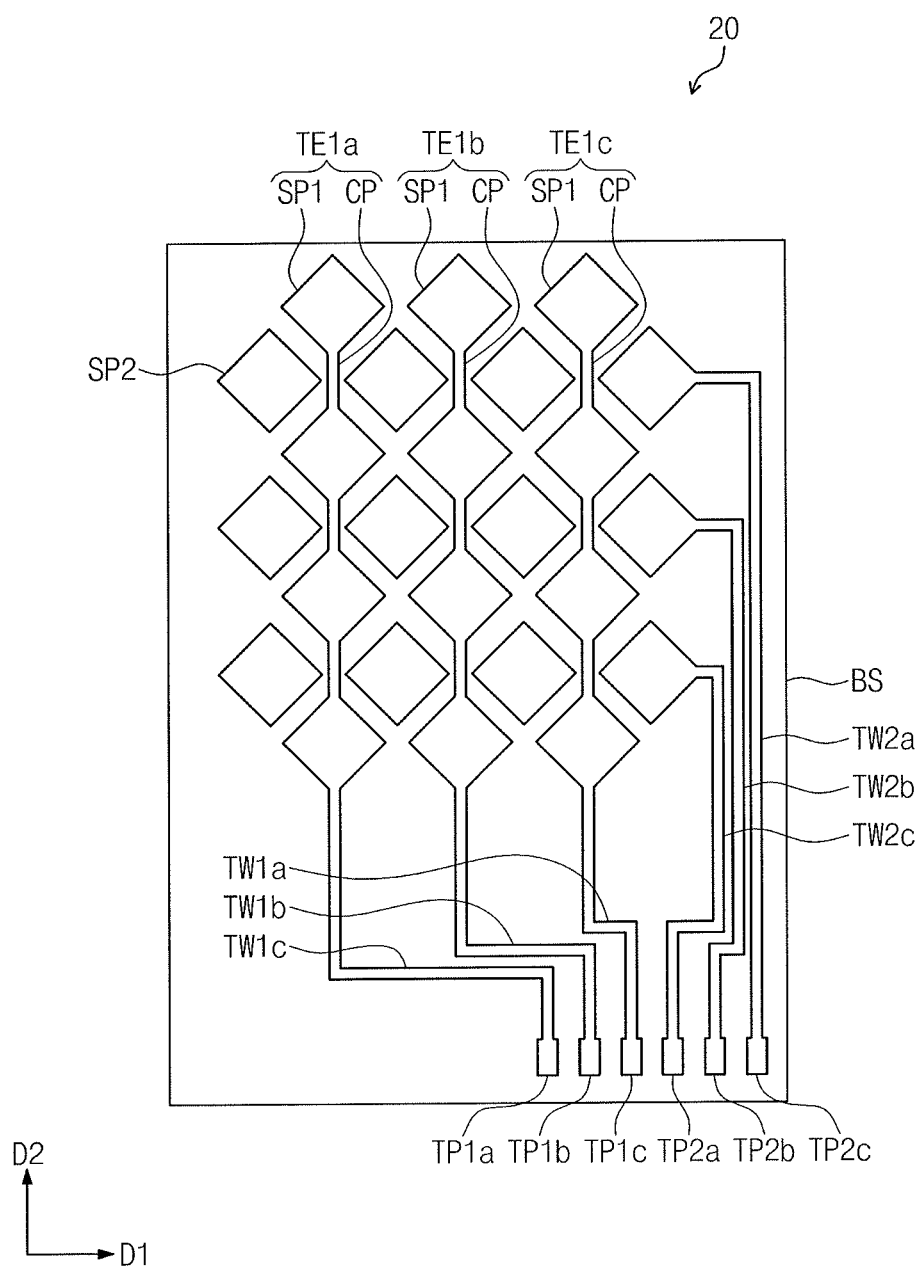

As shown in FIG. 7A, electrode patterns may be formed on the base substrate BS. The electrode patterns may include first sensing parts SP1, connecting parts CP, and second sensing parts SP2.

The first sensing parts SP1, connecting parts CP, and second sensing parts SP2 may be patterned simultaneously from a same, e.g., single, base layer, or may be deposited simultaneously by using a same, e.g., single, mask. In an implementation, the first sensing parts SP1, connecting parts CP, and second sensing parts SP2 may also be sequentially formed as disposed on the same layer.

Figure 7B:
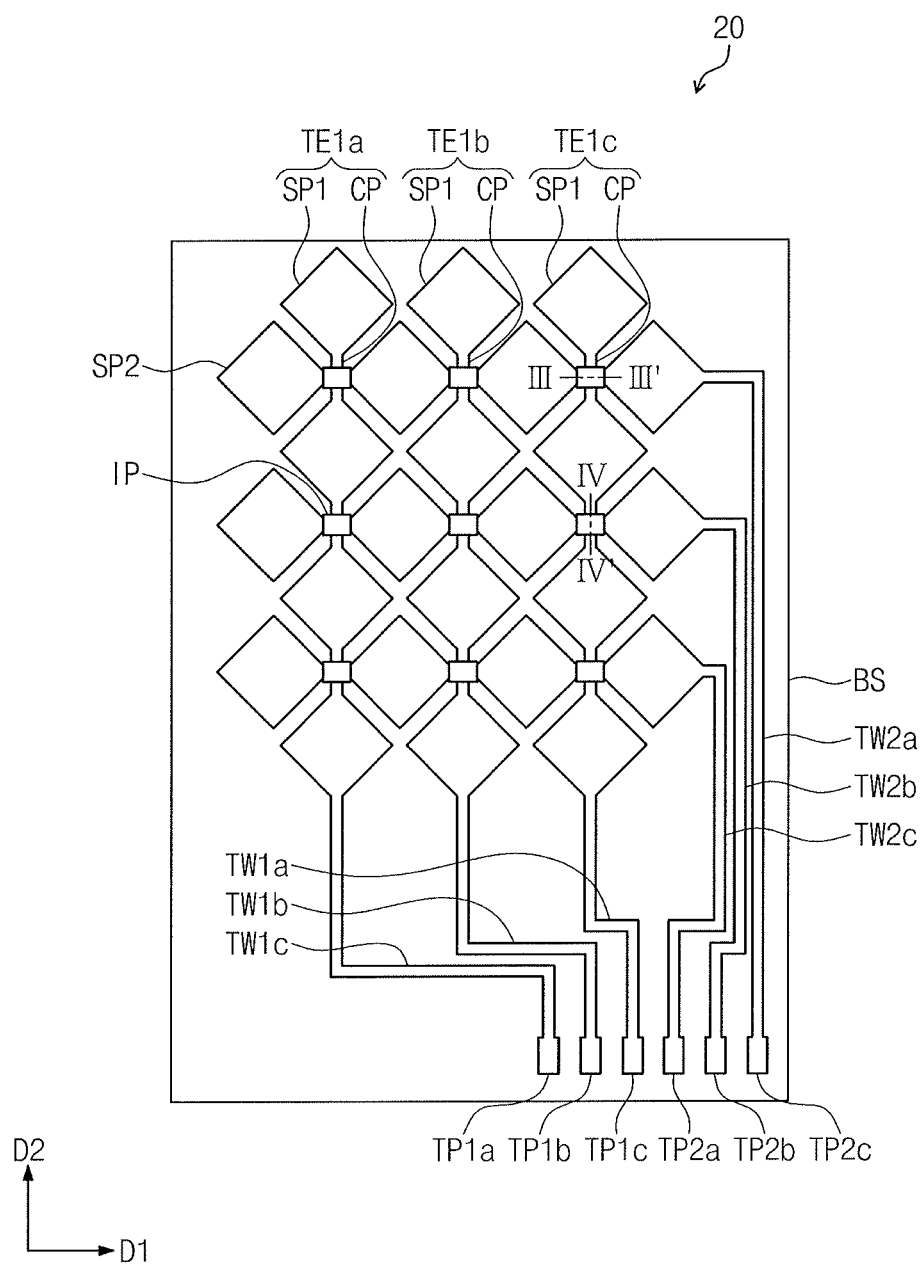

As shown in FIG. 7B, insulating patterns IP may be formed on the electrode patterns. The insulating patterns IP may overlap with or overlie respective ones of the connecting parts CP. The insulating patterns IP may be formed by, e.g., a deposition or patterning process.

Figure 7C:
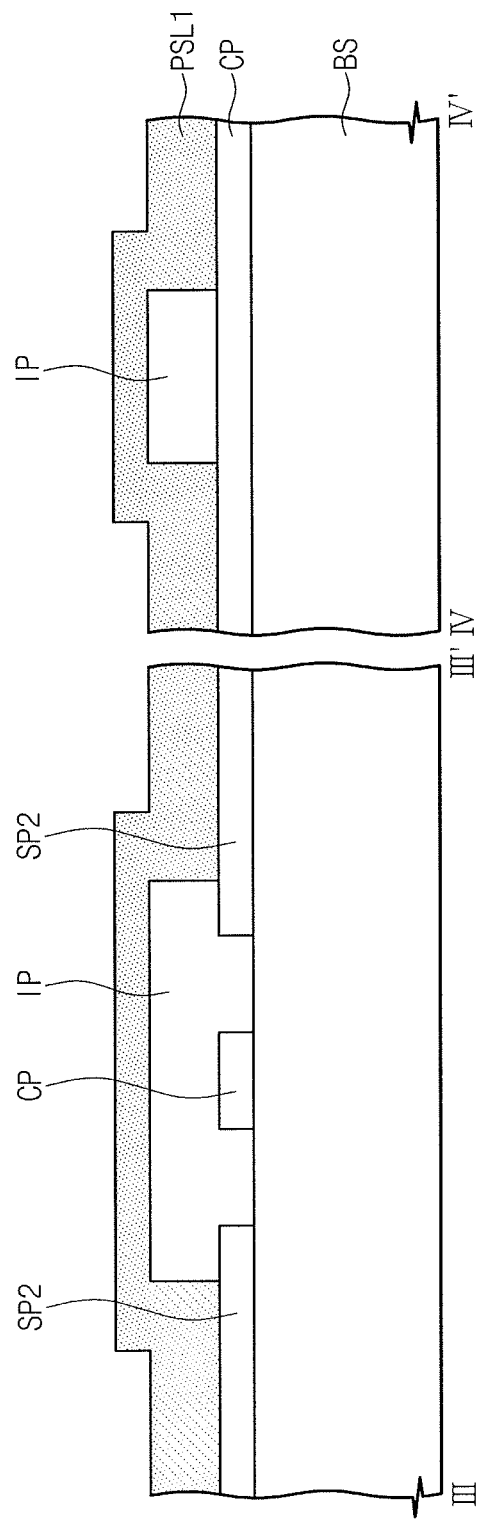

As shown in FIG. 7C, a first photosensitive layer PSL1 may be formed on the base substrate BS. The first photosensitive layer PSL1 may be formed by applying a liquid photoresist on the base substrate BS and then the drying of the applied liquid photoresist. The first photosensitive layer PSL1 may cover the insulating patterns IP and the electrode patterns.

The liquid photoresist may include a photosensitive resin. In an implementation, the liquid photoresist may include, e.g., about 80% to about 85% of 2-methoxy-1-methylethyl acetate, about 1% to about 5% of benzyl alcohol, and about 5% to about 10% of novolak resin derivative.

Figure 7D:
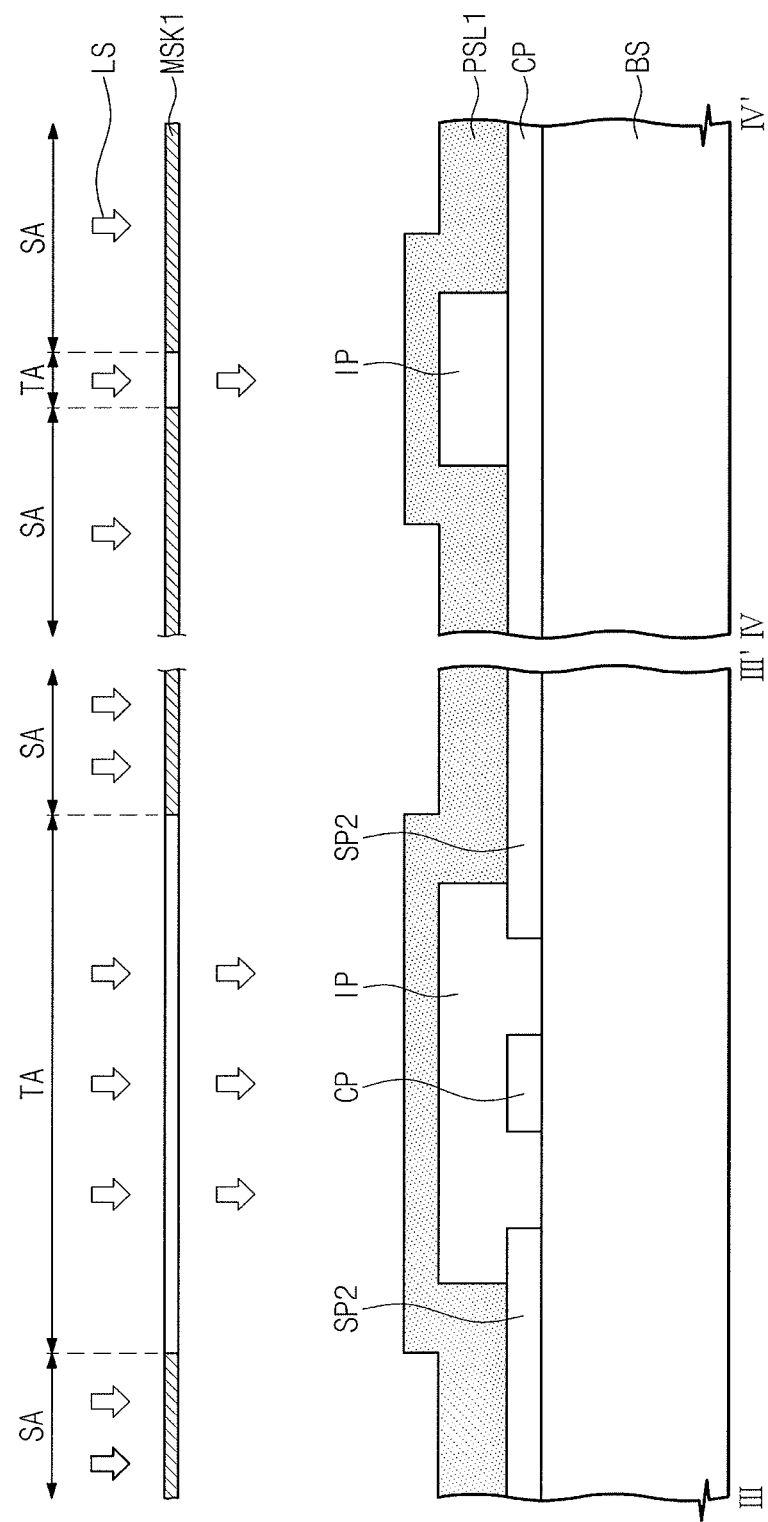
Figure 7E:
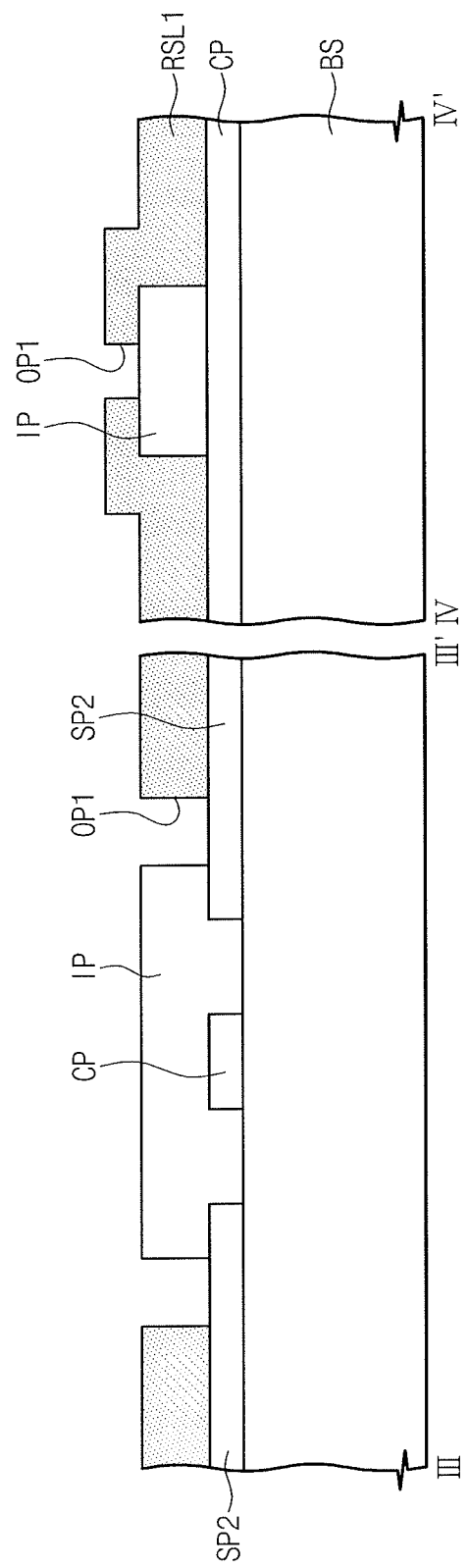

Referring to FIGS. 7D and 7E, a first sacrificial layer RSL1 (on or in which first openings OP1 are defined or provided) may be formed. For example, a mask MSK1 may be disposed over the first photosensitive layer PSL1 and light LS may be irradiated onto the first photosensitive layer PSL1.

The mask MSK1 may be divided into or include a shield region SA (shielding or blocking the light LS) and a transmission region TA (transmitting the light LS). Only the light passing through the transmission region TA may be provided to the first photosensitive layer PSL1 to thereby form the first sacrificial layer RSL1.

The liquid photoresist may be a positive type or negative type. The present embodiment shows a case where the liquid photoresist is the positive type. For example, a portion of the first photosensitive layer PSL1 corresponding to the transmission region TA is exposed to the light LS and experience photolysis reaction.

The portion of the first photosensitive layer PSL1 corresponding to (e.g., aligned with) the transmission region TA may be removed by a development process, to thereby form the first sacrificial layer RSL1 from what remains of the first photosensitive layer PSL1. The first openings OP1 may thus be defined.

The first openings OP1 may expose a portion of each of the insulating patterns IP and may expose a portion of the second sensing parts SP2. Each of the first openings OP1 may have a line shape crossing the connecting part CP.

As shown in FIGS. 7F to 7I, a second sacrificial layer RSL2 may be formed on the first sacrificial layer RSL1. The second sacrificial layer RSL2 may be formed by using a dry film.

As shown in FIG. 7F, a dry film DF photosensitive resist may be provided on the first sacrificial layer RSL1. The dry film DF may include a base layer DFa and a photosensitive resin layer DFb on a side (e.g., top side) of the base layer DFa.

The photosensitive resin layer DFb may have adhesion, e.g., may exhibit adhesive properties. Thus, the photosensitive resin layer DFb may be attached to the base layer DFa, may maintain a relatively thick thickness, and may thus be stably provided on the base substrate BS.

As shown in FIG. 7G, a heat source LM may be provided on or adjacent to the dry film DF to laminate the dry film DF. The heat source LM may be heat or light. The photosensitive resin layer DFb may have a flexible state through phase change in response to the light or heat.

Accordingly, a second photosensitive layer PSL2 (including a lower layer L1 and an upper layer L2) may be formed. The phase-changed photosensitive resin layer DFb may form the lower layer L1 and the base layer DFa may form the upper layer L2. The lower layer L1 (having the flexible state) may fill at least a portion of the first openings OP1.

Figure 7H:
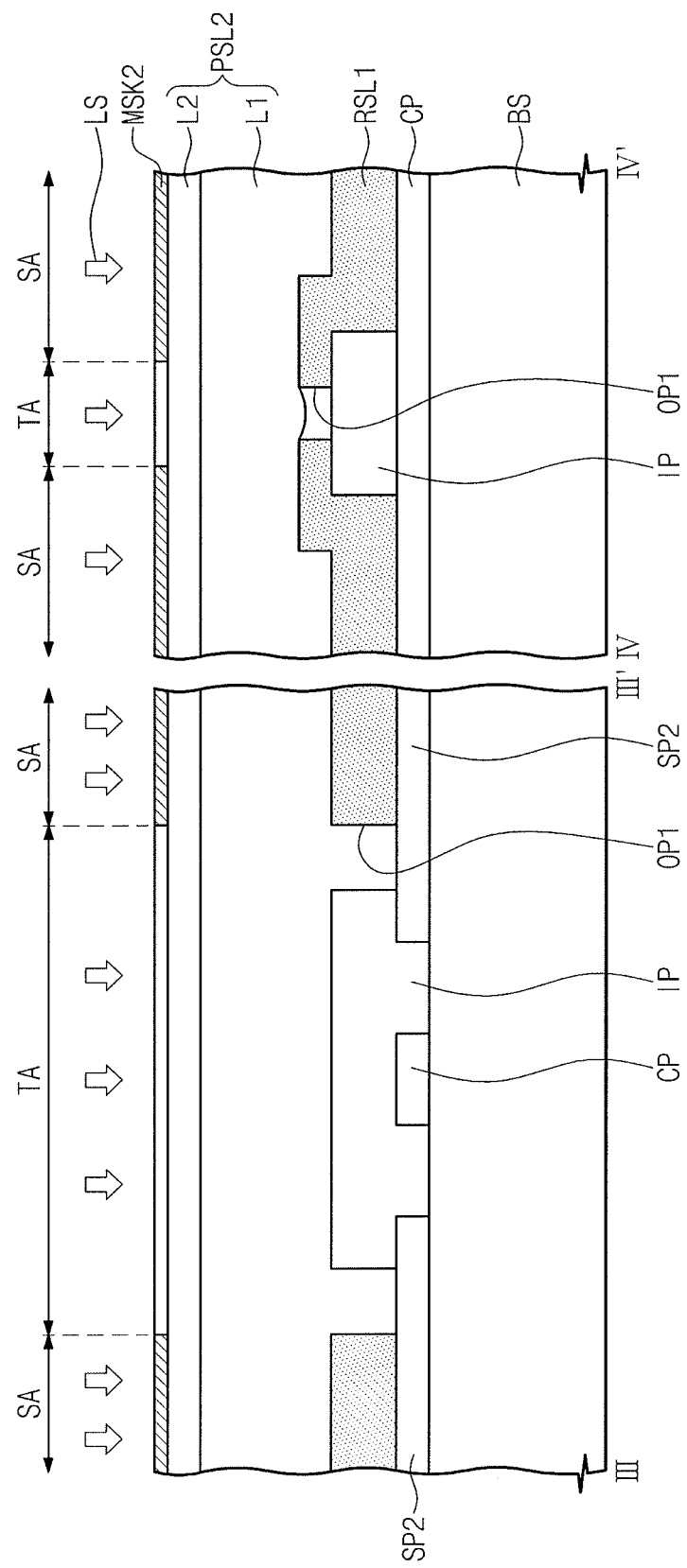
Figure 7I:
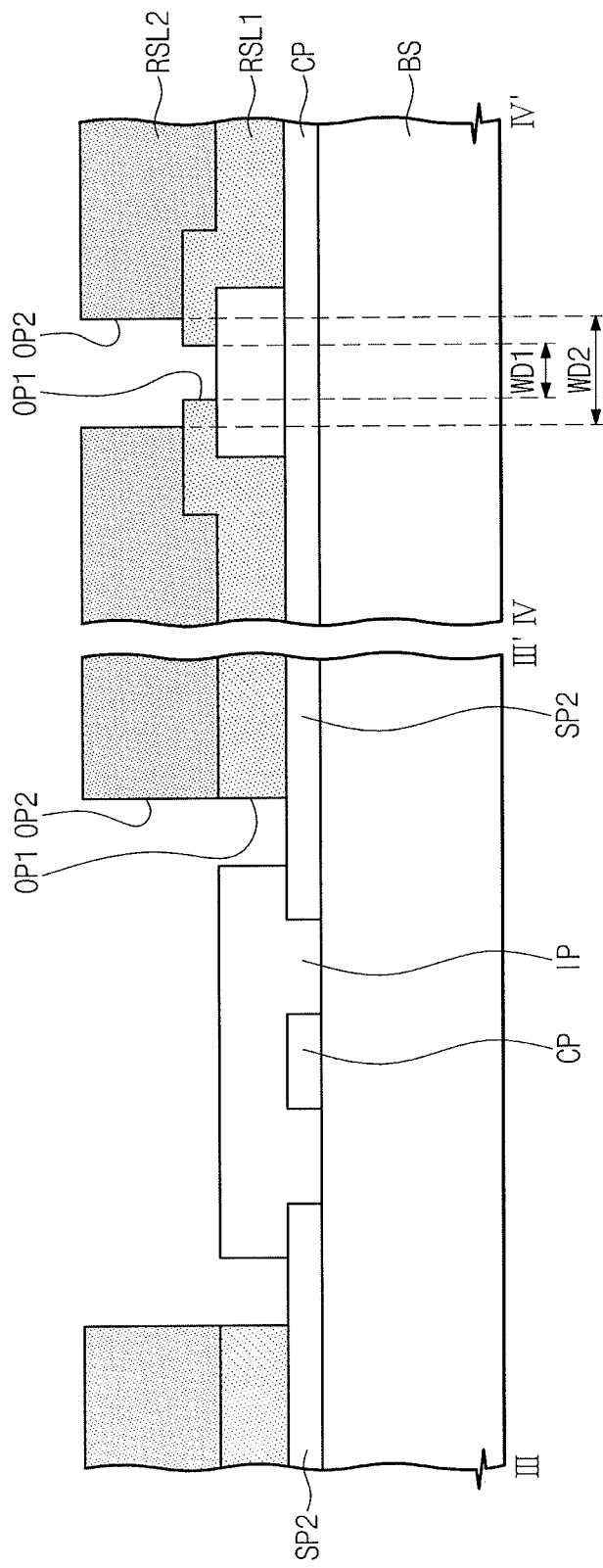

As shown in FIGS. 7H and 7I, second openings OP2 may be formed in the second photosensitive layer PSL2 to thereby form the second sacrificial layer RSL2 from remaining portions of the second photosensitive layer PSL2. For example, a mask MSK2 may be provided on the second photosensitive layer PSL2, and light LS may be irradiated to the mask MSK2. In an implementation, the mask MSK2 may be provided to be in contact with the second photosensitive layer PSL2. For example, in the process of patterning the second photosensitive layer PSL2, accuracy in the arrangement and shape of formed patterns may be enhanced.

The mask MSK2 may be disposed at an interval (e.g., spaced apart) from the lower layer L1, e.g., with the upper layer L2 therebetween. Thus, it is possible to help reduce and/or prevent damage to the mask MSK2 or the second photosensitive layer PSL2 due to adhesion of the material of the lower layer L1 to the mask MSK2 in a light exposure process.

In an implementation, the mask MSK2 may be disposed at an interval or spaced apart from the second photosensitive layer PSL2 or may be in contact with the lower layer L1 (e.g., without or omitting the upper layer L2).

Dry film resists may maintain a thicker thickness than liquid photoresist. For example, the thickness of the second sacrificial layer RSL2 may be larger than that of the first sacrificial layer RSL1.

The second sacrificial layer RSL2 may have a thickness about 4 times to about 8 times thicker than the thickness of the first sacrificial layer RSL1. For example, the second sacrificial layer RSL2 may have a thickness of about 3.0 μm to about 8.0 μm. An increase in the thickness of the sacrificial layer RSL is advantageous to a lift-off process to be described below. Related descriptions are provided below.

In the present embodiment, the second sacrificial layer RSL2 may include a positive photosensitive resin layer. For example, a portion corresponding to the transmission region TA of the mask MSK2 may be removed by a subsequent development process, and the second openings OP2 are formed.

For example, in order to form the second openings OP2, it is possible to use a mask having the same shape as the mask for forming the first openings OP1. In an implementation, the second sacrificial layer RSL2 may include various suitable photosensitive resin layers DFb.

In an implementation, an area (e.g., in one plane) of each of the second openings OP2 may be greater than that (in the same plane) of the first openings OP1. For example, each of the first openings OP1 may have a first width WD1, and each of the second openings OP2 may have a second width WD2 that is wider than the first width WD1.

As described above, the dry film resist having a film shape may have a thick thickness and may have high adhesion, unlike the liquid photoresist. For example, it may be relatively difficult to form a fine pattern with the dry film resist, and the second width WD2 may be relatively wider than the first width WD1. In an implementation, the second width WD2 may be formed to have substantially the same area and width as the first width WD1.

Figure 7J:
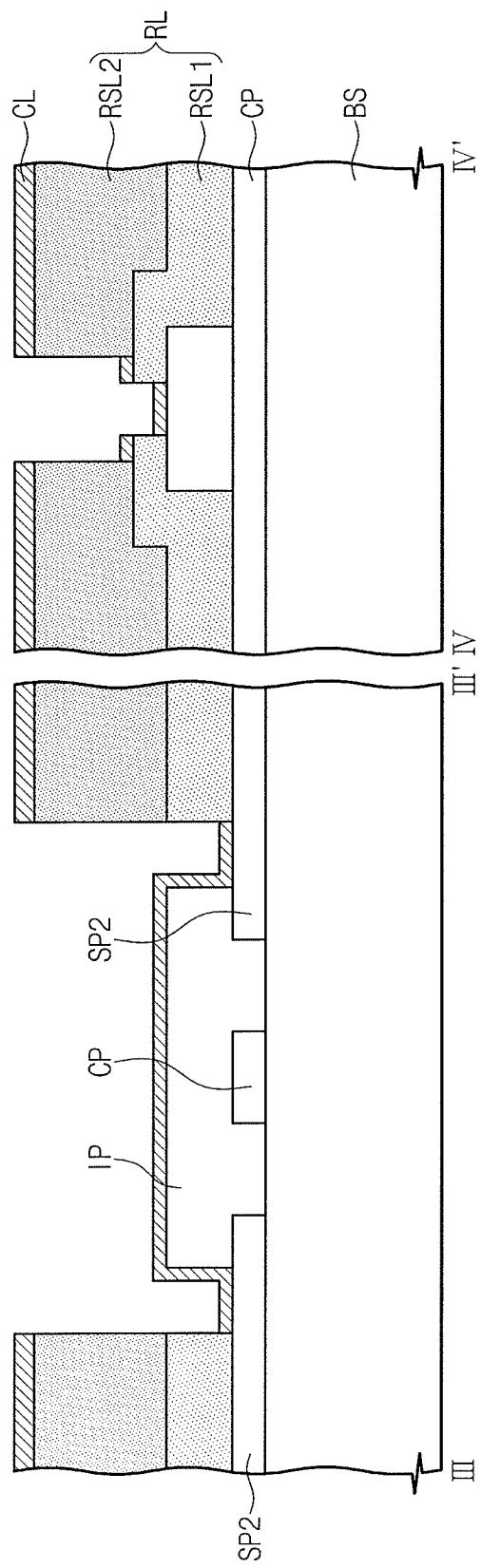
Figure 7K:
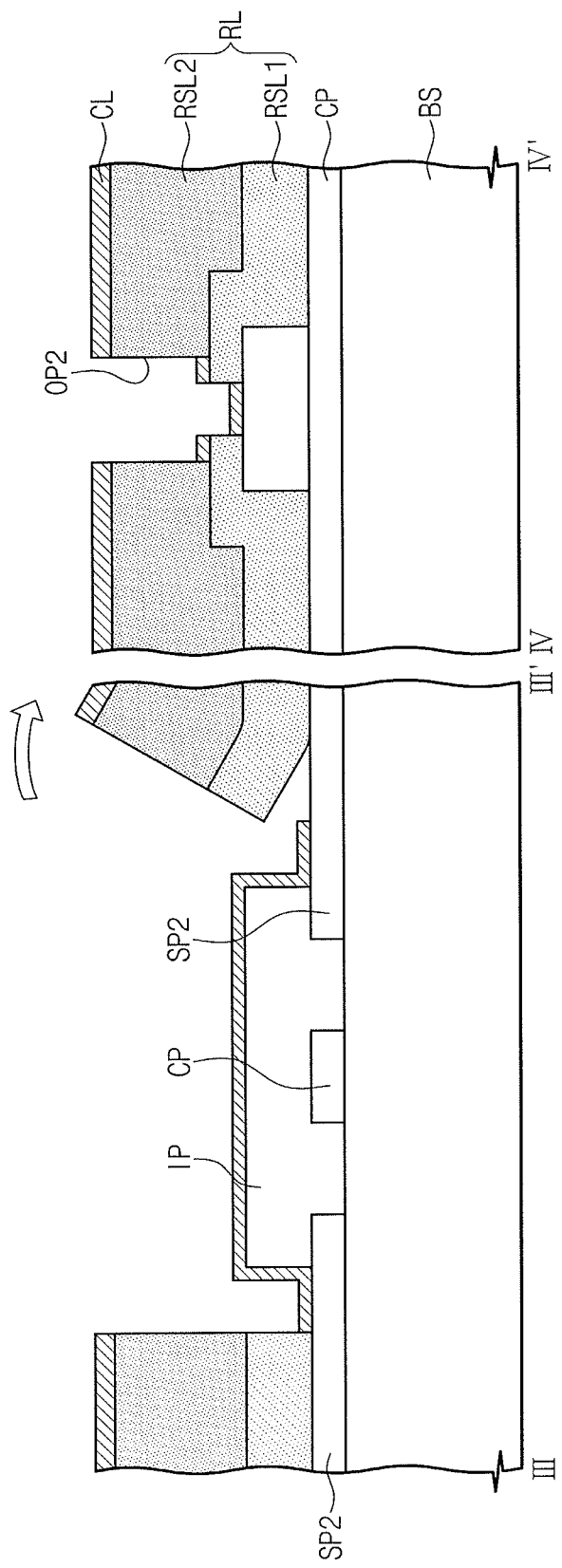
Figure 7L:
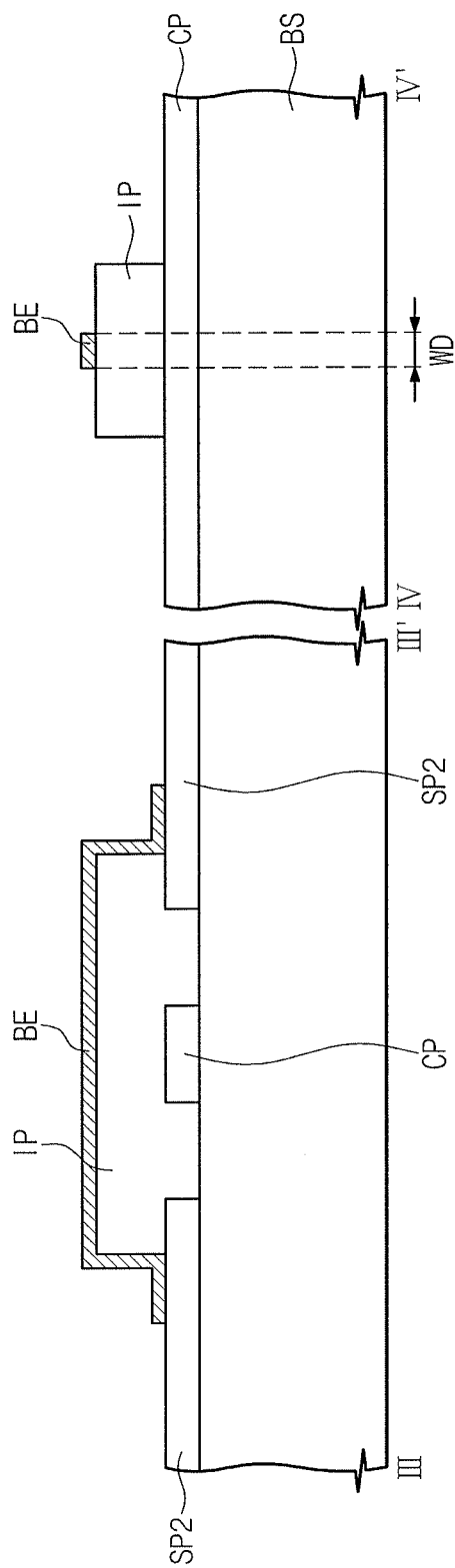

As shown in FIGS. 7J to 7L, bridge patterns BE may be formed on the base substrate BS. For example, first, a conductive layer CL may be formed on the second sacrificial layer RSL2 as shown in FIG. 7J.

The conductive layer CL may be formed on an entire surface of the base substrate BS through a deposition process. Thus, the conductive layer CL may also be formed on a portion (e.g., of the insulating pattern IP and the second electrode pattern SP2) exposed by the sacrificial layers RSL1 and RSL2.

Then, the sacrificial layers RSL1 and RSL2 may be removed from the base substrate BS to form the bridge patterns BE, as shown in FIGS. 7K and 7L. In an implementation, the sacrificial layers RSL1 and RSL2 may be removed by performing a lift-off process.

In an implementation, the sacrificial layers RSL1 and RSL2 may be developed by a developer provided from the outside and may then be lift off. The sacrificial layers RSL1 and RSL2 according to an embodiment may include the thick second sacrificial layer RSL2, and a lateral face defining the openings OP1 and OP2 may be relatively wide. Thus, the sacrificial layers RSL1 and RSL2 may be in contact with the developer in a wide area, and they may be easily removed from the electrode patterns SP2 and CP.

The method of manufacturing a touch panel according to an embodiment may include performing a lift-off process, and there is an advantage in that there may be no need to use separate etchant for removing the sacrificial layer RL. For example, the lift-off process may remove the sacrificial layer as it is, shape deformation of the bridge patterns BE may be decreased or prevented, and thus patterns having high accuracy may be formed.

As shown in FIG. 7K, the sacrificial layers RSL1 and RSL2 may be peeled off from the electrode patterns SP2 and CP in the direction as indicated by the arrow. In this case, portions of the conductive layer CL formed on the sacrificial layers RSL1 and RSL2 may be removed along with the sacrificial layers RSL1 and RSL2.

As shown in FIG. 7L, only portions of the conductive layer CL corresponding to the first openings OP1 may remain to form the bridge patterns BE. For example, the bridge patterns BE have the same shape as (e.g., may have a shape complementary to) the first openings OP1, respectively.

The width of each of the bridge patterns BE may be the substantially same as the first width WD1 (see FIG. 7I). In an implementation, each of the bridge patterns BE may be formed in the shape of a fine line having a width WD less than or equal to about 15 μm on the plane.

A method of manufacturing a touch panel according to an embodiment may have advantages in that it is possible to form a fine pattern by using the first sacrificial layer RSL1 having a small thickness and, furthermore, it is possible to use a liftoff process by using the second sacrificial layer RSL2 having a large thickness. Thus, a method of manufacturing a touch panel according to an embodiment may easily form a metal pattern having a nanometer-scale width and may thus be easily applied to a high-resolution display device.

Figure 8A:
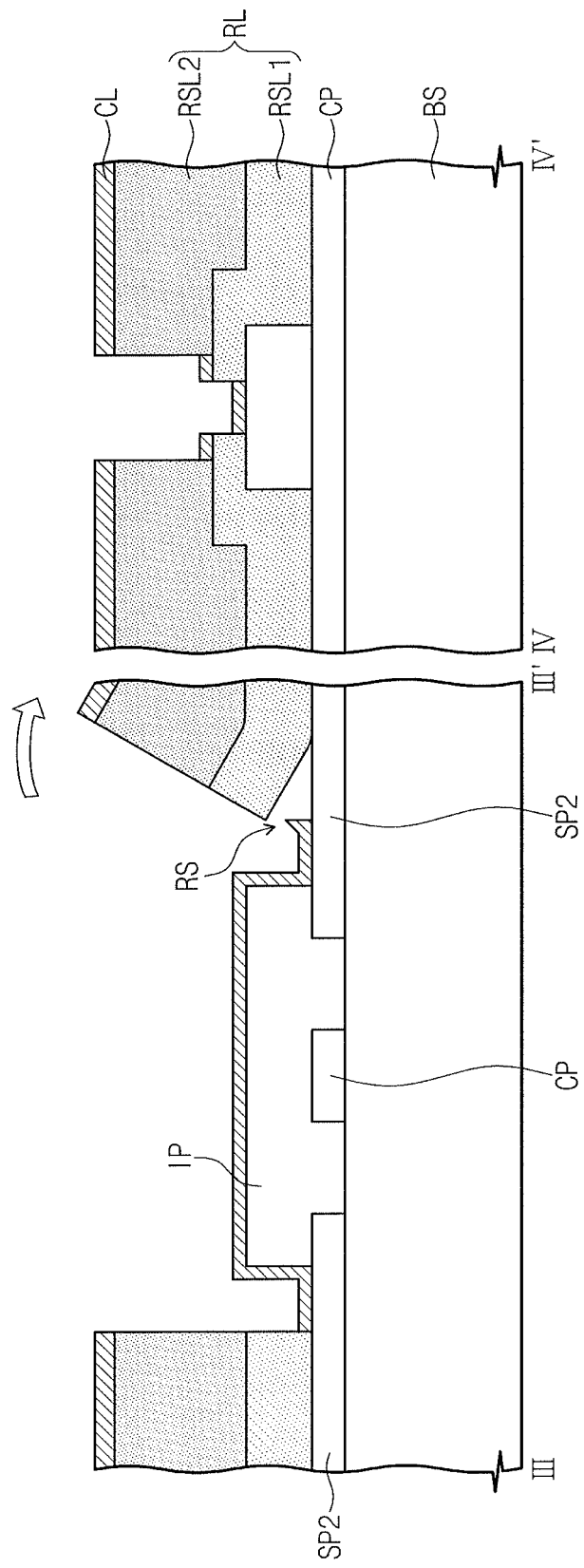

FIGS. 8A and 8B illustrate cross-sectional views showing stages in a method of manufacturing a touch unit according to an embodiment. FIGS. 8A and 8B illustrate only a lift-off step. In the following, the same components as those in FIGS. 1 to 7L have the same reference numerals and repeated detailed descriptions thereof may be omitted.

The bridge patterns BE-1 according to the present embodiment may further include the residual part RS. The boundary of the bridge pattern BE-1 may be in contact with the sacrificial layer RL. In the process of removing the sacrificial RL, a portion of the boundary of the bridge pattern BE-1 may come with the sacrificial layer RL.

As the sacrificial layer RL is completely removed from the electrode patterns SP2 and CP, a portion of a boundary or edge of the bridge pattern BE-1 may be fixed in a state in which the portion has risen along the sacrificial layer RL and then fixed. As one of byproducts of the lift-off process, the residual portion RS may be formed on or at the boundary of the bridge pattern BE-1. A touch panel according to an embodiment may be formed using the lift-off process, and the residual portion RS may be formed.

FIGS. 9A to 9F illustrate cross-sectional views of stages in a method of manufacturing a touch unit according to an embodiment. FIGS. 9A to 9F mostly show steps having differences from those in FIGS. 7A to 7L. In the following, the same components as those in FIGS. 1 to 7L have the same reference numerals and repeated detailed descriptions thereof may be omitted.

Figure 9A:
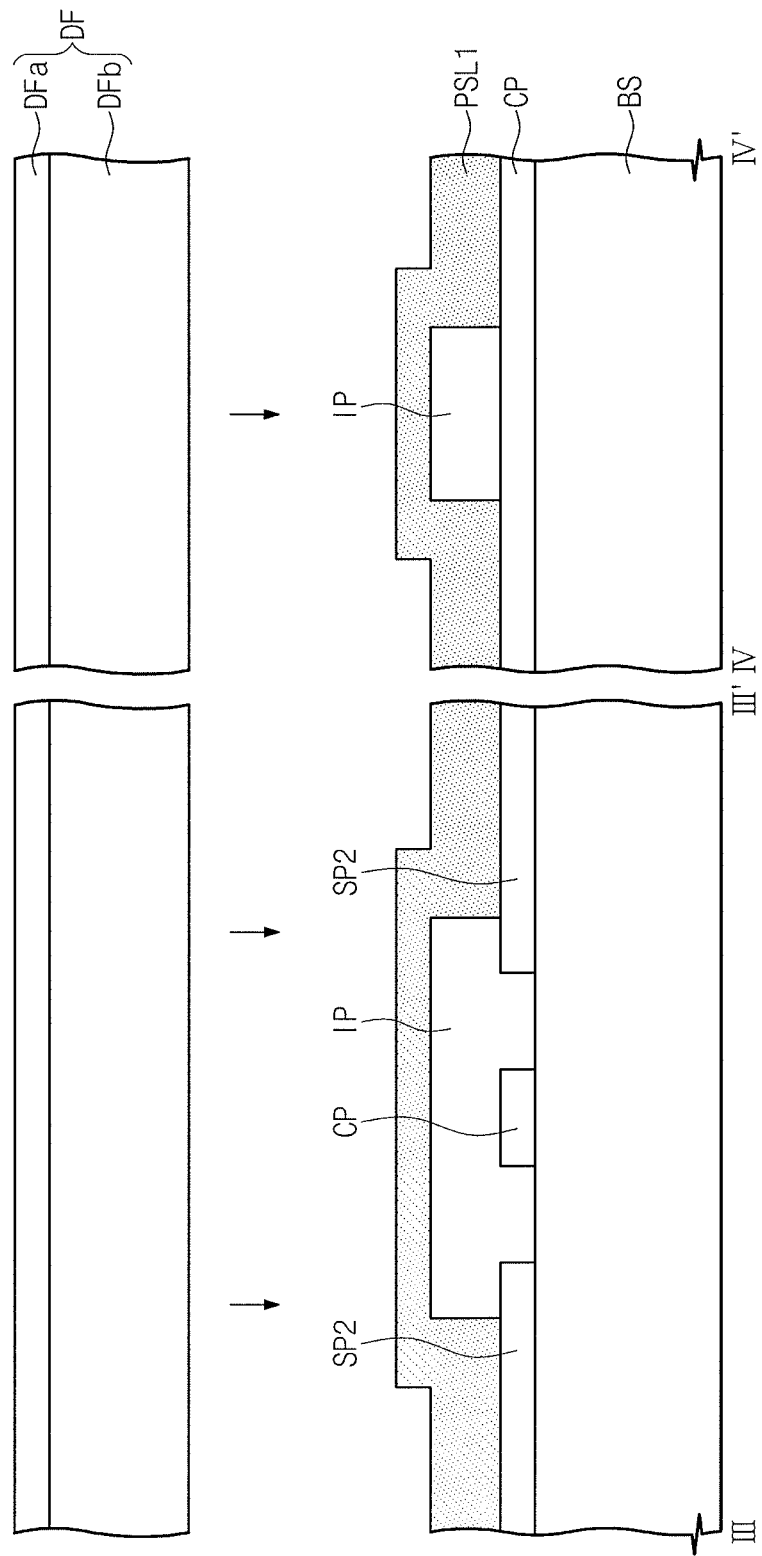
Figure 9B:
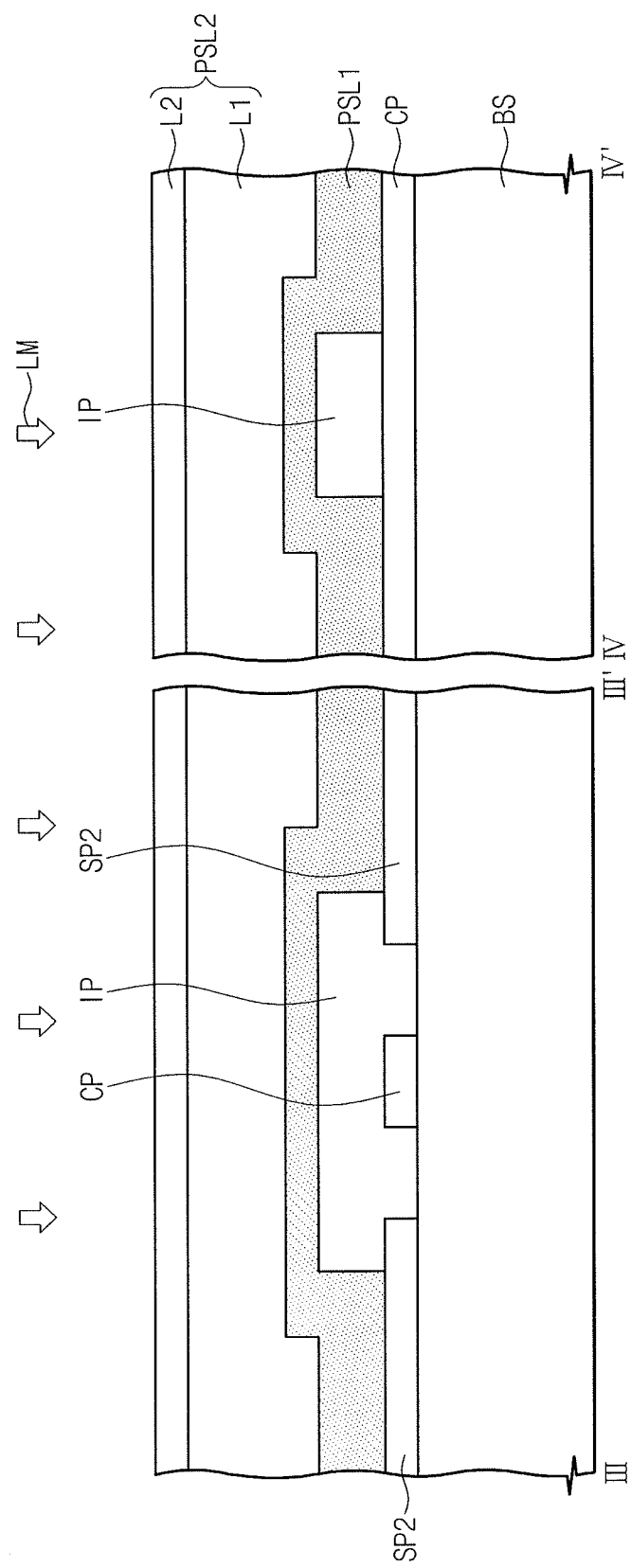

As shown in FIGS. 9A and 9B, the second photosensitive layer PSL2 may be formed on the first photosensitive layer PSL1. The dry film DF may be provided on the unpatterned first photosensitive layer PSL1, and then laminated.

Figure 9D:
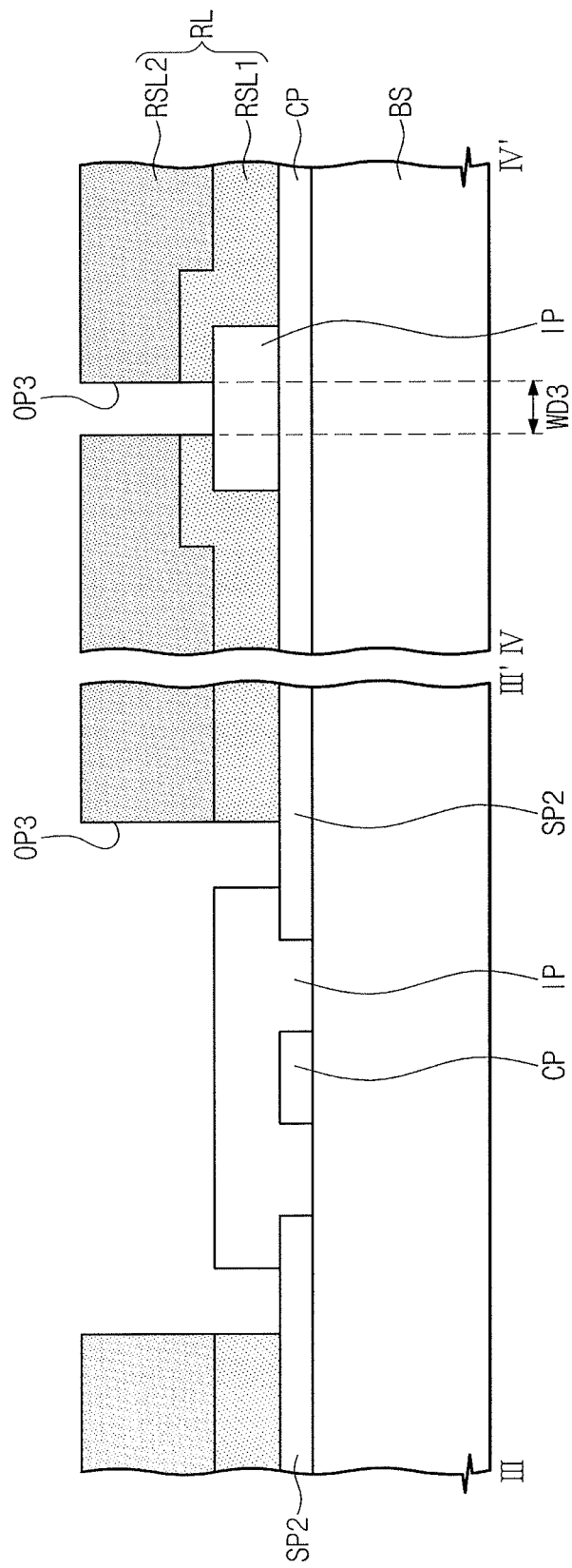

As shown in FIGS. 9C and 9D, the first photosensitive PSL1 and the second photosensitive layer PSL2 may be simultaneously patterned so that third openings are formed. For example, a mask MSK3 may be disposed on the second photosensitive layer PSL2, and the light LS may be irradiated. In this case, portions of the first photosensitive layer PSL1 and the second photosensitive layer PSL2 corresponding to the transmission regions TA may experience or undergo a photolysis reaction.

Then, the portions of the first photosensitive layer PSL1 and the second photosensitive layer PSL2 that have undergone the photolysis reaction may be removed through a development process so that the third openings OP3 are formed. Each of the third openings OP3 may pass through the first photosensitive layer PSL1 and the second photosensitive layer PSL2 to expose a portion of the insulating pattern IP and a portion of the second sensing portions SP2, thereby forming the first sacrificial layer RSL1 and the second sacrificial layer RSL2.

Each of the third openings OP3 may have a third width WD3, and may be in the shape of a line crossing the connecting parts CP. The third width WD3 may be substantially the same as the width WD of the bridge pattern BE to be described below.

Figure 9E:
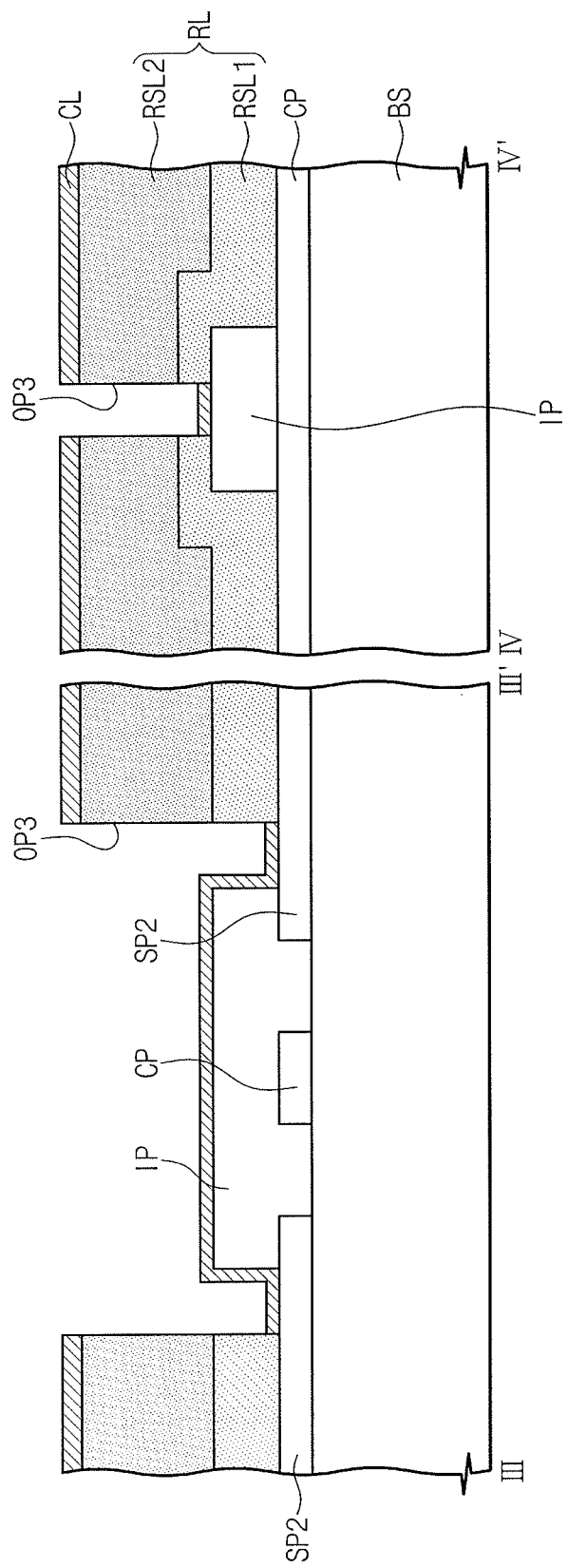
Figure 9F:
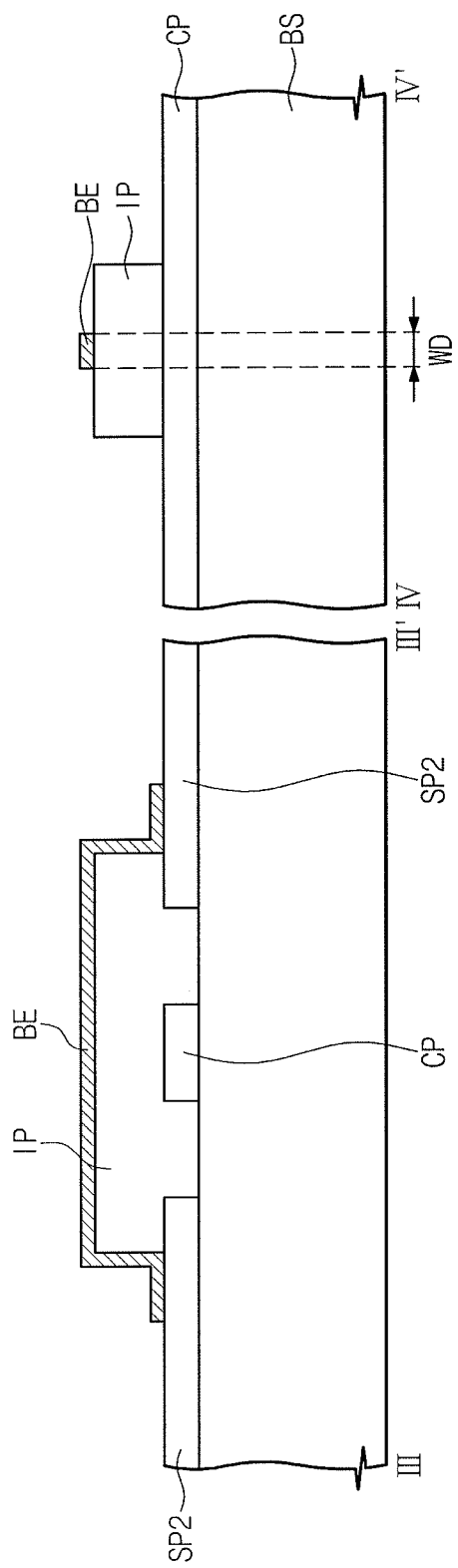

As shown in FIGS. 9E and 9F, a conductive layer CL may be deposited on the sacrificial layers RSL1 and RSL2, and the sacrificial layers RSL1 and RSL2 may be removed so that bridge patterns BE are formed. The process of removing the sacrificial layers RSL1 and RSL may include performing a lift-off process, and related detailed descriptions thereof will be found in the description section about FIGS. 7J to 7L.

A method of manufacturing a touch panel according to the present embodiment may continuously and/or simultaneously form the opening in the first photosensitive layer PSL1 and the opening in the second photosensitive layer PSL2. Thus, it is possible to form the bridge patterns BE with a single mask MS3, e.g., without adding a separate mask, and a manufacturing process is simplified and yield may be enhanced.

The method of manufacturing the touch panel according to an embodiment may include the use of the sacrificial layer that includes the plurality of photosensitive layers to form the bridge patterns. The sacrificial layer may include the first photosensitive layer having a small thickness, and it is possible to easily form the bridge patterns having a fine shape. Also, the sacrificial layer may include the second photosensitive layer having a large thickness, and it may be easily removed through the lift-off process. The method of manufacturing the touch panel according to an embodiment may help reduce and/or prevent the shape deformation of the bridge patterns (that could otherwise occur during a chemical process) by removing the sacrificial layer by using a physical process.

By way of summation and review, touch electrodes may be electrically connected to corresponding electrodes and insulated from counter electrodes. Even if the touch electrodes were disposed on the same layer through bridge patterns, they could be electrically connected only to corresponding electrodes.

The embodiments provide a method of manufacturing a touch panel including a lift-off process.

The embodiments may provide a method of manufacturing a touch panel that forms a bridge pattern through a liftoff process.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of manufacturing a touch panel, the method comprising:
   forming electrode patterns;
   forming insulating patterns on the electrode patterns;
   forming a sacrificial layer on the electrode patterns and the insulating patterns such that the sacrificial layer includes openings exposing portions of the insulating patterns;
   forming a conductive layer on the sacrificial layer and in each of the openings; and
   removing the sacrificial layer to form bridge patterns corresponding to the openings,
   wherein the sacrificial layer includes:
   a first layer including first openings therein that expose portions of the insulating patterns; and
   a second layer including second openings therein that expose portions of the insulating patterns, the second layer having a thickness that is larger than a thickness of the first layer.

2. The method as claimed in claim 1, wherein removing the sacrificial layer includes performing a lift-off process.

3. The method as claimed in claim 2, wherein:
   the first layer is formed using liquid photoresist, and
   the second layer is formed using a dry film.

4. The method as claimed in claim 3, wherein the dry film includes:
   a support layer; and
   a photosensitive resin layer on the support layer, the photosensitive resin layer having adhesive properties.

5. The method as claimed in claim 4, wherein the liquid photoresist is of a positive type.

6. The method as claimed in claim 5, wherein the photosensitive resin layer is of a positive type.

7. The method as claimed in claim 4, wherein:
   the thickness of the first layer is about 0.1 µm to about 2.0 µm, and
   the thickness of the second layer is about 3.0 µm to about 8.0 µm.

8. The method as claimed in claim 3, wherein:
   forming the sacrificial layer includes forming the first layer and forming the second layer, and
   the first openings and the second openings are separately formed.

9. The method as claimed in claim 8, wherein forming the first layer includes:
   applying the liquid photoresist to the electrode patterns and drying the applied liquid photoresist to form a first photosensitive layer; and
   forming the first openings in the first photosensitive layer.

10. The method as claimed in claim 9, wherein forming the second layer includes:
    providing the dry film on the first layer;
    laminating the dry film to form a second photosensitive layer; and
    forming the second openings in the second photosensitive layer.

11. The method as claimed in claim 10, wherein a width of each of the second openings when viewed from one direction is wider than a width of each of the first openings when viewed from the one direction.

12. The method as claimed in claim 3, wherein the first openings and the second openings are simultaneously formed.

13. The method as claimed in claim 12, wherein forming the sacrificial layer includes:
    applying the liquid photoresist to the electrode patterns;
    drying the liquid photoresist to form a first photosensitive layer;
    providing the dry film on the first photosensitive layer;
    laminating the dry film to form a second photosensitive layer; and
    simultaneously pattering the first photosensitive layer and the second photosensitive layer to form the first openings and the second openings.

14. The method as claimed in claim 1, wherein forming the conductive layer includes performing a deposition process.

15. The method as claimed in claim 1, wherein the electrode patterns include:
    first sensing parts that are spaced apart from each other in one direction;
    connecting parts that extend in one direction between adjacent first sensing parts to connect the adjacent first sensing parts; and
    second sensing parts arranged in another direction crossing the one direction, the second sensing parts being spaced apart from each other with the connecting parts therebetween.

16. The method as claimed in claim 15, wherein the insulating patterns cross respective ones of the connecting parts.

17. The method as claimed in claim 16, wherein:
    the bridge patterns are insulated from and cross respective ones of the connecting parts, and
    the bridge patterns connect adjacent second sensing parts.

18. The method as claimed in claim 17, wherein a width of each of the bridge patterns measured in the other direction is less than or equal to about 20 µm.

* * * * *